(12) United States Patent
Keeley et al.

(10) Patent No.: US 11,495,401 B2
(45) Date of Patent: Nov. 8, 2022

(54) PROXIMITY SENSING SYSTEM FOR WIRELESS CHARGING PODS AND CHARGING POD RACKS FOR GAME DEVICES WITH RECHARGEABLE BATTERIES

(71) Applicant: DDSports, Inc., Merriam, KS (US)

(72) Inventors: Thomas J. Keeley, Kansas City, MO (US); Bruce C. Ianni, Mission Hills, KS (US); Davyeon D. Ross, Overland Park, KS (US); Clint A. Kahler, Spring Hill, KS (US); Michael Maziarz, Wilbraham, MA (US); Patrick M. Herron, Austin, TX (US)

(73) Assignee: DDSPORTS, INC., Merriam, KS (US)

( * ) Notice: Subject to any disclaimer, the term of this patent is extended or adjusted under 35 U.S.C. 154(b) by 173 days.

(21) Appl. No.: 17/111,822

(22) Filed: Dec. 4, 2020

(65) Prior Publication Data

US 2021/0099024 A1    Apr. 1, 2021

Related U.S. Application Data

(63) Continuation of application No. 16/367,047, filed on Mar. 27, 2019, now Pat. No. 10,862,350.
(Continued)

(51) Int. Cl.
*H01F 38/14* (2006.01)
*H02J 50/90* (2016.01)
(Continued)

(52) U.S. Cl.
CPC .......... *H01F 38/14* (2013.01); *H02J 7/0013* (2013.01); *H02J 7/00045* (2020.01); *H02J 50/10* (2016.02);
(Continued)

(58) Field of Classification Search
CPC .......... H02J 17/00; H02J 5/005; H02J 7/025
(Continued)

(56) References Cited

U.S. PATENT DOCUMENTS

| 4,438,588 A | 3/1984 | Martin |
| 5,293,354 A | 3/1994 | Costabile |

(Continued)

FOREIGN PATENT DOCUMENTS

| EP | 1232772 A2 | 8/2002 |
| EP | 2472288 A1 | 7/2012 |

(Continued)

OTHER PUBLICATIONS

Baca et al. "Rapid feedback systems for elite sports training." Pervasive Computing, IEEE 5.4 (2006): 70-76.
(Continued)

*Primary Examiner* — David V Henze-Gongola
(74) *Attorney, Agent, or Firm* — Grady L. White; Potomac Law Group, PLLC

(57) ABSTRACT

A system automatically detecting that an authorized game device or object with a rechargeable battery is close to or in contact with a wireless charging pod for the gaming device or object, automatically initiating and managing charging operations for authorized game device, and automatically deactivating the charging operations when the rechargeable batteries are fully charged, or when the authorized game device is moved out of wireless charging range.

14 Claims, 16 Drawing Sheets

Related U.S. Application Data

(60) Provisional application No. 62/648,443, filed on Mar. 27, 2018.

(51) Int. Cl.
| | | |
|---|---|---|
| *H04B 1/38* | (2015.01) | |
| *H04B 17/318* | (2015.01) | |
| *H02J 50/80* | (2016.01) | |
| *H02J 50/40* | (2016.01) | |
| *H02J 50/10* | (2016.01) | |
| *H02J 7/00* | (2006.01) | |
| *H04L 101/622* | (2022.01) | |

(52) U.S. Cl.
CPC ............ *H02J 50/40* (2016.02); *H02J 50/402* (2020.01); *H02J 50/80* (2016.02); *H02J 50/90* (2016.02); *H04B 1/38* (2013.01); *H04B 17/318* (2015.01); *H02J 7/0044* (2013.01); *H04L 2101/622* (2022.05)

(58) Field of Classification Search
USPC ........................................................ 320/108
See application file for complete search history.

(56) References Cited

U.S. PATENT DOCUMENTS

| | | |
|---|---|---|
| 5,316,293 A | 5/1994 | Hamilton |
| 5,526,326 A | 6/1996 | Fekete et al. |
| 5,697,791 A | 12/1997 | Nashner et al. |
| 5,776,018 A | 7/1998 | Simpson et al. |
| 5,871,406 A | 2/1999 | Worrell |
| 6,157,898 A | 12/2000 | Marinelli |
| 6,177,861 B1 | 1/2001 | MacLellan et al. |
| 6,280,352 B1 | 8/2001 | Coffeen et al. |
| 6,389,368 B1 | 5/2002 | Hampton |
| 6,418,179 B1 | 7/2002 | Shieh |
| 6,514,160 B1 | 2/2003 | Cooper |
| 6,582,329 B1 | 6/2003 | Cabrera |
| 6,597,683 B1 | 7/2003 | Gehring et al. |
| 6,620,057 B1 | 9/2003 | Pirritano et al. |
| 6,944,148 B1 | 9/2005 | Gehring et al. |
| 6,946,950 B1 | 9/2005 | Ueno et al. |
| 6,960,999 B2 | 11/2005 | Haimovitch et al. |
| 7,091,863 B2 | 8/2006 | Ravet |
| 7,095,312 B2 | 8/2006 | Erario et al. |
| 7,133,396 B1 | 11/2006 | Schmidl et al. |
| 7,182,704 B2 | 2/2007 | Levy |
| 7,625,314 B2 | 12/2009 | Ungari et al. |
| 7,771,320 B2 | 8/2010 | Riley et al. |
| 7,843,348 B2 | 11/2010 | Hayford et al. |
| 7,854,669 B2 | 12/2010 | Marty et al. |
| 7,920,052 B2 | 4/2011 | Costabile |
| 7,949,295 B2 | 5/2011 | Kumar et al. |
| 8,038,549 B2 | 10/2011 | Vann |
| 8,079,925 B2 | 12/2011 | Englert et al. |
| 8,099,258 B2 | 1/2012 | Alten et al. |
| 8,231,487 B2 | 7/2012 | Nurnberg et al. |
| 8,248,212 B2 | 8/2012 | Frederick |
| 8,249,254 B1 | 8/2012 | Daniel |
| 8,289,170 B2 | 10/2012 | Pryor et al. |
| 8,360,904 B2 | 1/2013 | Oleson et al. |
| 8,465,382 B2 | 6/2013 | Moye |
| 8,517,869 B2 | 8/2013 | Steidle |
| 8,540,560 B2 | 9/2013 | Crowley et al. |
| 8,579,632 B2 | 11/2013 | Crowley |
| 8,597,095 B2 | 12/2013 | Crowley et al. |
| 8,622,832 B2 | 1/2014 | Marty et al. |
| 8,687,546 B2 | 4/2014 | Gong et al. |
| 8,702,430 B2 | 4/2014 | Dibenedetto et al. |
| 8,777,815 B2 | 7/2014 | Case et al. |
| 8,786,415 B2 | 7/2014 | Cavallaro et al. |
| 8,951,106 B2 | 2/2015 | Crowley et al. |
| 8,968,100 B2 | 3/2015 | Hohteri |
| 9,041,546 B2 | 5/2015 | Pryor et al. |
| 9,129,153 B2 | 9/2015 | Ianni et al. |
| 9,186,568 B2 | 11/2015 | Ianni et al. |
| 9,254,432 B2 | 2/2016 | Ianni et al. |
| 9,308,417 B2 | 4/2016 | Grundy |
| 9,502,018 B2 | 11/2016 | Cronin et al. |
| 9,849,361 B2 | 12/2017 | Coza et al. |
| 9,858,451 B2 | 1/2018 | Ianni et al. |
| 9,971,916 B1 | 5/2018 | Ianni et al. |
| 10,159,888 B2 | 12/2018 | Ianni et al. |
| 10,238,941 B2 | 3/2019 | Ianni et al. |
| 2002/0107092 A1 | 8/2002 | Gottlieb-Myers et al. |
| 2003/0054905 A1 | 3/2003 | King |
| 2003/0181268 A1 | 9/2003 | Nelson |
| 2004/0145342 A1 | 7/2004 | Lyon |
| 2004/0160310 A1 | 8/2004 | Chen et al. |
| 2005/0223799 A1 | 10/2005 | Murphy |
| 2005/0225437 A1 | 10/2005 | Shiotsu et al. |
| 2005/0261609 A1 | 11/2005 | Collings et al. |
| 2006/0052055 A1 | 3/2006 | Rowse et al. |
| 2006/0105857 A1 | 5/2006 | Stark |
| 2006/0184705 A1 | 8/2006 | Nakajima |
| 2007/0135243 A1 | 6/2007 | LaRue et al. |
| 2007/0173355 A1 | 7/2007 | Klein |
| 2007/0219024 A1 | 9/2007 | Allegre |
| 2008/0015061 A1 | 1/2008 | Klein |
| 2008/0088303 A1 | 4/2008 | Englert |
| 2008/0274844 A1 | 11/2008 | Ward |
| 2008/0298280 A1 | 12/2008 | Joshi et al. |
| 2009/0048070 A1 | 2/2009 | Vincent et al. |
| 2009/0111616 A1 | 4/2009 | Creelman |
| 2009/0117525 A1 | 5/2009 | Bavaro et al. |
| 2009/0191988 A1 | 7/2009 | Klein |
| 2009/0256688 A1 | 10/2009 | Khan |
| 2010/0248622 A1 | 9/2010 | Kirby et al. |
| 2011/0054782 A1 | 3/2011 | Kaahui |
| 2011/0074345 A1 | 3/2011 | Erario et al. |
| 2011/0176464 A1 | 7/2011 | Warner et al. |
| 2012/0058845 A1 | 3/2012 | Crowley et al. |
| 2012/0281547 A1 | 11/2012 | Kim et al. |
| 2012/0316843 A1 | 12/2012 | Beno et al. |
| 2012/0322587 A1 | 12/2012 | Duke |
| 2012/0323496 A1 | 12/2012 | Burroughs et al. |
| 2013/0066448 A1 | 3/2013 | Alonso |
| 2013/0130843 A1 | 5/2013 | Burroughs et al. |
| 2013/0154387 A1 | 6/2013 | Lee et al. |
| 2013/0167290 A1 | 7/2013 | Ezra |
| 2013/0172131 A1 | 7/2013 | Bove et al. |
| 2013/0182718 A1 | 7/2013 | Kim et al. |
| 2013/0288600 A1 | 10/2013 | Kuusilinna et al. |
| 2014/0039651 A1 | 2/2014 | Crowley |
| 2014/0111154 A1* | 4/2014 | Roy .................. H02J 50/50 320/108 |
| 2014/0135150 A1 | 5/2014 | Thurman et al. |
| 2014/0135955 A1 | 5/2014 | Burroughs |
| 2014/0135956 A1 | 5/2014 | Thurman et al. |
| 2014/0135957 A1 | 5/2014 | Thurman et al. |
| 2014/0135958 A1 | 5/2014 | Thurman et al. |
| 2014/0135959 A1 | 5/2014 | Thurman et al. |
| 2014/0195019 A1 | 7/2014 | Thurman et al. |
| 2014/0195020 A1 | 7/2014 | Thurman et al. |
| 2014/0195021 A1 | 7/2014 | Thurman et al. |
| 2014/0195022 A1 | 7/2014 | Thurman et al. |
| 2014/0200103 A1 | 7/2014 | Thurman et al. |
| 2014/0200692 A1 | 7/2014 | Thurman et al. |
| 2014/0222177 A1 | 8/2014 | Thurman et al. |
| 2014/0247817 A1 | 9/2014 | Lim et al. |
| 2014/0266759 A1 | 9/2014 | Pryor et al. |
| 2014/0274486 A1 | 9/2014 | Thurman |
| 2014/0274487 A1 | 9/2014 | Thurman |
| 2014/0277634 A1 | 9/2014 | Thurman |
| 2014/0277635 A1 | 9/2014 | Thurman |
| 2014/0277636 A1 | 9/2014 | Thurman |
| 2014/0364974 A1 | 12/2014 | Wohl et al. |
| 2014/0371885 A1 | 12/2014 | Ianni et al. |
| 2015/0071158 A1 | 3/2015 | Fan et al. |
| 2015/0112464 A1 | 4/2015 | Crowley et al. |
| 2015/0265897 A1 | 9/2015 | Gordon et al. |
| 2015/0298558 A1 | 10/2015 | Lewis |
| 2015/0312493 A1 | 10/2015 | Aldridge et al. |

(56) References Cited

U.S. PATENT DOCUMENTS

| | | |
|---|---|---|
| 2015/0312494 A1 | 10/2015 | Aldridge et al. |
| 2015/0312497 A1 | 10/2015 | Aldridge et al. |
| 2015/0312504 A1 | 10/2015 | Aldridge et al. |
| 2015/0317801 A1 | 11/2015 | Bentley et al. |
| 2016/0096067 A1 | 4/2016 | Ianni et al. |
| 2016/0099757 A1 | 4/2016 | Leabman et al. |
| 2016/0112727 A1 | 4/2016 | Mate et al. |
| 2016/0285299 A1 | 9/2016 | Amand et al. |
| 2016/0322853 A1 | 11/2016 | Porat et al. |
| 2017/0072283 A1 | 3/2017 | Davisson et al. |
| 2017/0128814 A1 | 5/2017 | Ianni et al. |
| 2017/0144030 A1 | 5/2017 | King et al. |
| 2018/0131449 A1* | 5/2018 | Kare .................. H01S 5/06216 |

FOREIGN PATENT DOCUMENTS

| | | |
|---|---|---|
| JP | 2000061016 A | 2/2000 |
| WO | 2001025946 A1 | 4/2001 |
| WO | 2004009188 A1 | 1/2004 |
| WO | 2006038163 A1 | 4/2006 |
| WO | 2007006083 A1 | 1/2007 |
| WO | 2007084850 A2 | 7/2007 |
| WO | 2007130057 A1 | 11/2007 |
| WO | 2012121434 A1 | 9/2012 |
| WO | 2013029035 A1 | 2/2013 |
| WO | 2015069123 A1 | 5/2015 |
| WO | 2017125249 A1 | 7/2017 |

OTHER PUBLICATIONS

Beetz et al. "Computerized real-time analysis of football games." Pervasive Computing, IEEE 4.3 (2005): 33-39.
Danner et al. "Description of the Physical Activity of Young Children Using Movement Sensor and Observation Methods," Pediatric Exercise Science. 1991.
http://shootersrev.com/product/evo-one-sensorized-basketball/,Sep. 2014.
http://shop.94fifty.com, Sep. 2014.
http://swishmetrics.com, Sep. 2014.
http://vibradotech.com, Sep. 2014.
http://www.hooptracker.com, Sep. 2014.
http://www.noahbasketball.com/products, Sep. 2014.
http://www.shootaway.com, Sep. 2014.
http://www.wilson.com/smart/, Sep. 2014.
Introduction about Nintendo WII Software, Nintendo Korea, Jun. 24, 2010.

* cited by examiner

NEARBY DEVICE STATUS TABLE

| ADDRESS | UUID | RSSI | AGE | VALID |
|---|---|---|---|---|
| AABBCCDDEE | 4321c856-427b-4579-a3e0-a39b47fb7426 | -35 | 1 | TRUE |
| BBAACCDDEE | b0e16394-784c-4592-95fd-5a93d2029b5b | -67 | 0 | TRUE |
| CCAABBCCDD | 1c3836cd-4eab-4171-addb-e46254d78cb9 | -56 | 1 | TRUE |
| DDAABBCCEE | 86205054-e1cb-42b1-8958-d63dd0c04926 | -44 | 3 | TRUE |
| EEAABBCCDD | 55ac33ba-bd25-49db-b6a8-207ff1171c9a | -22 | 1 | TRUE |
| AAAAAAAAAA | a8dfbe28-78df-48f1-9902-0fa598cf89d8 | 0 | 0 | FALSE |
| BBBBBBBBBB | dddeae5d-72ad-4cb8-99b9-55be7ed4b6cb | 0 | 0 | FALSE |

FIG. 13

ALGORITHM FOR RECALIBRATING PROXIMITY SENSOR OFFSET

PROXIMITY SENSING SYSTEM FOR WIRELESS CHARGING PODS AND CHARGING POD RACKS FOR GAME DEVICES WITH RECHARGEABLE BATTERIES

CROSS-REFERENCE TO RELATED APPLICATIONS

This application is a continuation of U.S. application Ser. No. 16/367,047, filed Mar. 27, 2019, now U.S. Pat. No. 10,862,350, issued on Dec. 8, 2020, which claims priority to U.S. Provisional Application Ser. No. 62/648,443, filed Mar. 27, 2018, both of which are incorporated by reference in their entirety.

FIELD OF ART

The present invention relates generally to wireless charging pods and charging pod racks for game devices, such as electronics equipped basketballs, footballs, soccer balls, hockey pucks, etc., which contain one or more rechargeable batteries, and more particularly to proximity sensing systems for such wireless charging pods and charging pod racks.

BACKGROUND

Recent advances in miniature electronics and wireless data communications technology have given rise to fast-growing market in the sports industry for game devices and equipment (such as basketballs, basketball shoes, footballs, football pads, football helmets, soccer balls, cleats, hockey pucks, hockey pads, ice skates, baseballs, javelins, and the like) containing sensors, printed circuit boards, transmitters, receivers and other electronics. The integrated electronics together cooperate to produce and transmit to nearby computer systems or networks extremely detailed data about the current location, motion, trajectory and status of the game device or equipment during games and practice sessions. The sensors, transmitters, receivers and other electronics are typically powered by small, rechargeable batteries, which are attached to the printed circuit boards embedded inside the sporting equipment. The rechargeable batteries must be recharged periodically by coupling the sporting object with a battery charging device. For optimal user convenience, manufacturers are more and more frequently including in the sporting equipment wireless battery charging receiving circuits, so that the rechargeable batteries may be charged by moving the sporting device or equipment into physical contact with, or in close proximity to, a wireless battery charger.

In the United States, the Federal Communications Commission ("FCC") sets limits for electromagnetic emission levels at various frequencies, which effectively limits the duration and transmit distance for wireless battery charger. Therefore, leaving a wireless battery charger in an active, transmitting state while it is not actually delivering a charge to a device with a rechargeable battery, such as a game ball or other sport device, such as a basketball, football or soccer ball, with a wholly- or partially-depleted rechargeable battery, not only wastes energy (higher efficiency is important for an embodiment of a battery powered charger), but could possibly run afoul of present or future FCC regulations. Wireless battery chargers for game devices also need to avoid accidentally charging (or overcharging) an unauthorized device (such as a cellphone), due to the potential fire hazard.

On the other hand, it is both cumbersome and inconvenient for users to have to manually activate and deactivate wireless chargers for balls and equipment with rechargeable batteries. Manual activation of wireless charges for sports equipment is also error prone because users frequently do not know how long a charge will take to complete, and may remove the sport device from the charger prematurely, may forget to deactivate the charger, or may otherwise not be around to deactivate the charger when the battery charging is complete. In other words, manually activating and deactivating wireless chargers may involve a lot of guesswork, which often results in a considerable amount of wasted energy, as well as damaged or degraded rechargeable batteries. Furthermore, while it is possible to use a mechanical or optical switch to detect the presence of a game device, and only activating the charger only so long as the mechanical or optical switch is engaged, such systems are generally expensive to manufacture and maintain, and do not possess the fidelity, reliability and durability required for many collegiate, semi-professional and professional sports environments.

Accordingly, there is considerable need in the sports industry for a reliable and durable device, and a method, for automatically initiating, monitoring and completing wireless charging operations in primary and secondary wireless charging devices for sporting equipment, based on various factors, such as whether a sports device (e.g., a ball) with a rechargeable battery is within range of the charger, whether the rechargeable battery is already substantially charged to its full capacity, and how long the primary charger has been activated without being coupled to a rechargeable battery.

SUMMARY AND DESCRIPTION OF THE PRESENT INVENTION

Embodiments of the present invention provide a wireless charging pod and a wireless charging pod rack for sporting equipment, which automatically handles charging operations when an authorized game device with a rechargeable battery is in range of a wireless charging transmitter circuit, and automatically deactivates the wireless charging transmitter circuit when the authorized game device with the rechargeable battery moves out of range of the wireless charging transmitter circuit. Wireless charging devices of the present invention are typically configured to perform one or more of the following functions in connection with charging a nearby rechargeable device: (1) using radio frequency transceivers to automatically detect and confirm the presence and range of an authorized game device with a rechargeable battery, (2) automatically determining the current charging state of the rechargeable battery, (3) automatically activating and deactivating a charging circuit to charge the rechargeable battery in the game device, (4) automatically determining the end of a charge (battery full condition) for the rechargeable battery, (5) automatically determining when the game device was removed from charging range, and (6) automatically exchanging other relevant charge-related data messages, before, during and after a charging session.

BRIEF DESCRIPTION OF THE DRAWINGS

The various advantages of the embodiments of the present invention will become apparent to one skilled in the art upon reading the following specification and appended claims, with reference to the appended drawings, in which:

FIG. 13 shows a diagram illustrating by way of example the contents of a Nearby Device Status Table, stored in the memory of the wireless charging pod, that could be used to monitor and track unique identification numbers (UUIDs), MAC addresses, RSSI values, timeouts and validity flags associated with game devices, such as basketballs, according to certain embodiments of the present invention.

DETAILED DESCRIPTION OF EXEMPLARY EMBODIMENTS

Figure 1:
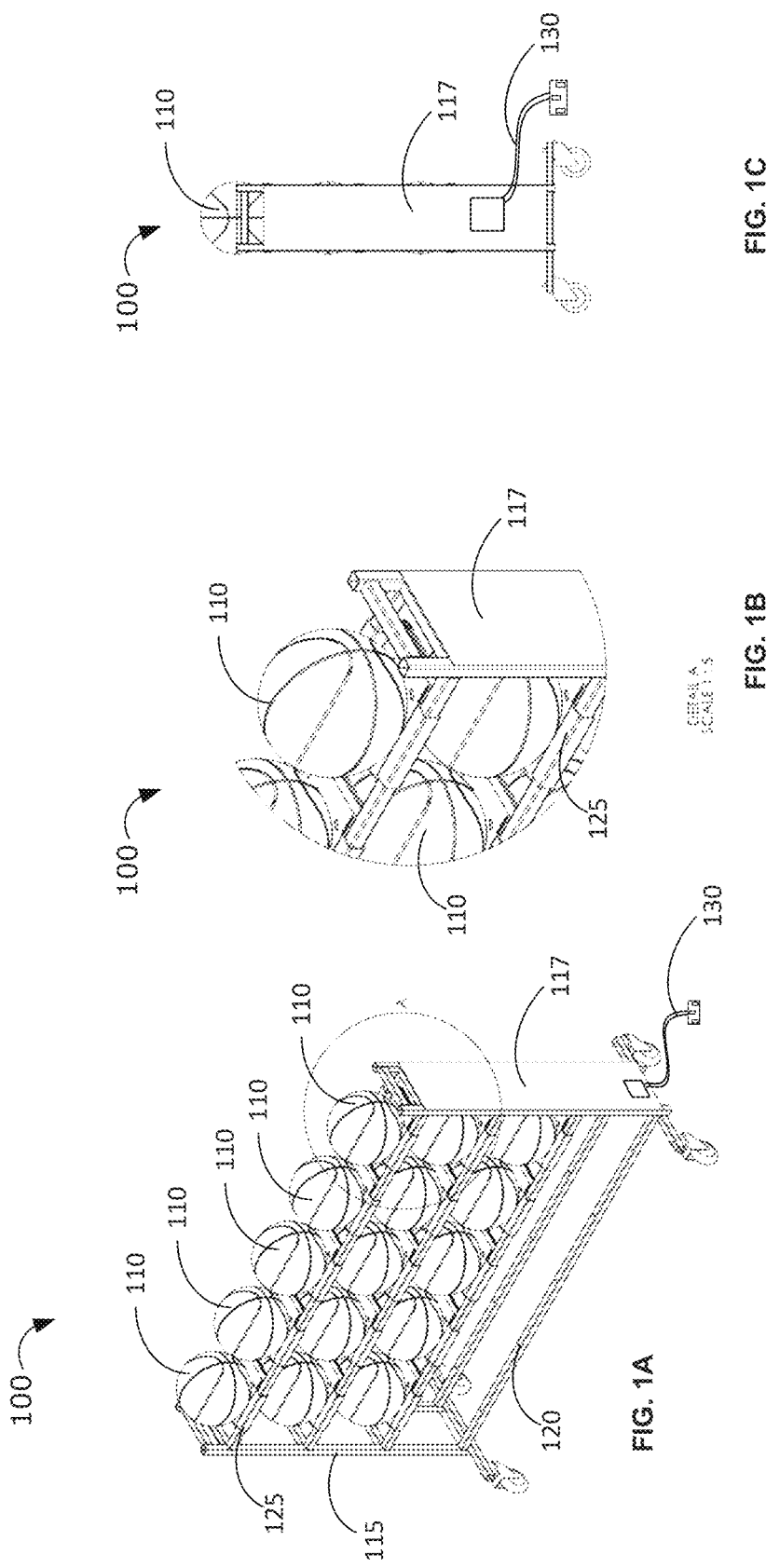
FIGS. 1A, 1B and 1C show, respectively, an isometric view of a charging pod rack, an up-close isometric view of a portion of the charging pod rack, and a side view of the charging pod rack according to one embodiment of the present invention.

A problem in the conventional art is that the ability to send status messages between a charger and a wireless device with a charging coil and rechargeable battery over the transmission channel used for charging the wireless battery is significantly constrained by the distance between the charging device and the wireless device. In some cases, communication over the charging channel becomes less and less practical and reliable, and eventually becomes impossible, as the distance between the charging device and rechargeable device increases beyond more than a few centimeters. Indeed, the typically small sizes of the transmitting and receiving coils, as well as the relatively large distances that sometimes exist between them, frequently makes it impossible to use the charging channel to communicate any data between the charging transmitter coil and the charging receiver coil.

One potential solution is the leave the charger transmitting coil on all the time. However, leaving the charging transmitter on all the time is undesirable from a regulation and power consumption standpoint, especially when there are many rechargeable devices and many chargers in close proximity to each other and associated with a single power outlet. Strongly coupled systems deal with receiver and transmitter coils of roughly the same size and are generally short distances apart. In strongly coupled systems, the transmitting and receive coils can detect the presence of each other and they can modulate signals/data in-band. In loosely coupled systems, the transmitter coil may not be able to detect the receiver, and communication between the two must occur out-of-band.

Typically, the charging frequency for a resonant wireless charging transmitter is around 6.78 MHz. The charging transmitter generates an electromagnetic field of alternating current. The electromagnetic field rapidly turns on and off, and on and off again during a charging operation. Data can be sent using the wireless charging transmitting circuit and the wireless charging receiving circuit ONLY when the transmitting circuit and the receiving circuit are a very short distance apart from each other. When the distance is greater than about thirteen (13) millimeters, then the charging circuits cannot be used to send data messages, activate and deactivate the charging operation, or detect the end of charge message produced by the ball so that the charge transmitter can be turned off.

In general, embodiments of the present invention use a second communication channel, such as a Bluetooth BLE channel, to communicate location-, alignment- and status-related messages between the sporting device and the wireless charging pod on a rack of wireless charging pods. A radio frequency transceiver on the sporting device broadcasts a universally unique identifier (UUID) to the radio transceiver on the wireless charging pod. When the broadcasted UUID is received by the wireless charging pod, a processor on the wireless charging pod is configured to determine and save a received signal strength indicator (RSSI) for the ball, based on the signal strength of the broadcast signal. When the RSSI exceeds a specified threshold, the wireless charging pod initiates a handshake to establish the Bluetooth BLE channel, and then the transceiver on the ball sends events for "End of Charge", "Rx Coil Voltage" and "Charger Detected" whenever the coil voltage or charge/end-of-charge states change. The transceiver in the wireless charging pod listens to the events and reacts accordingly by enabling/disabling the charge field or by blinking LEDs to indicate alignment status or charge status (as described in more detail below).

FIGS. 1A, 1B and 1C show, respectively, an isometric view of a charging pod rack 100, an up-close isometric view of a portion of the charging pod rack 100, and a side view of the charging pod rack 100 according to one embodiment of the present invention. As shown in these figures, the charging pod rack 100 is configured to hold and recharge the internal batteries (not shown) of a plurality of basketballs 110. As shown best in FIGS. 1A and 1B, the charging pod rack 100 may comprise a plurality of vertical poles 115 and vertical panels 117 arranged to hold up and support a plurality of parallel horizontal bars 120 connected to the vertical poles 115 spaced and arranged to hold up a plurality of removable wireless charging pods 125. In the embodiment shown in FIG. 1A, each one of the top three rows of the parallel horizontal bars 120 holds up to a total of five wireless charging pods 125, for a total of up to fifteen wireless charging pods 125, which in turn may be used to charge the rechargeable batteries in up to fifteen basketballs 110. In the example shown in FIG. 1A, the bottom row of parallel horizontal bars 120 does not contain any removable wireless charging pods 125. It should be understood, however, that an additional five (5) removable wireless charging pods (not shown) could be placed on the two parallel horizontal bars 120 of the bottom row to bring the total number of removable wireless charging pods 125 to twenty (20) so that the charging pod rack 100 may be used to simultaneously charge the rechargeable batteries in up to twenty (20) basketballs. A 120V AC power cable 130 connected to the charging pod rack 100 provides electrical power to the charging pod rack 100, which in turn provides electrical power to each one of the wireless charging pods 125 via a series of electrical power supply cords and connectors electrically coupling the wireless charging pods 125 directly to each other or directly to power supply cords running through the parallel horizontal bars 120.

Figure 2:
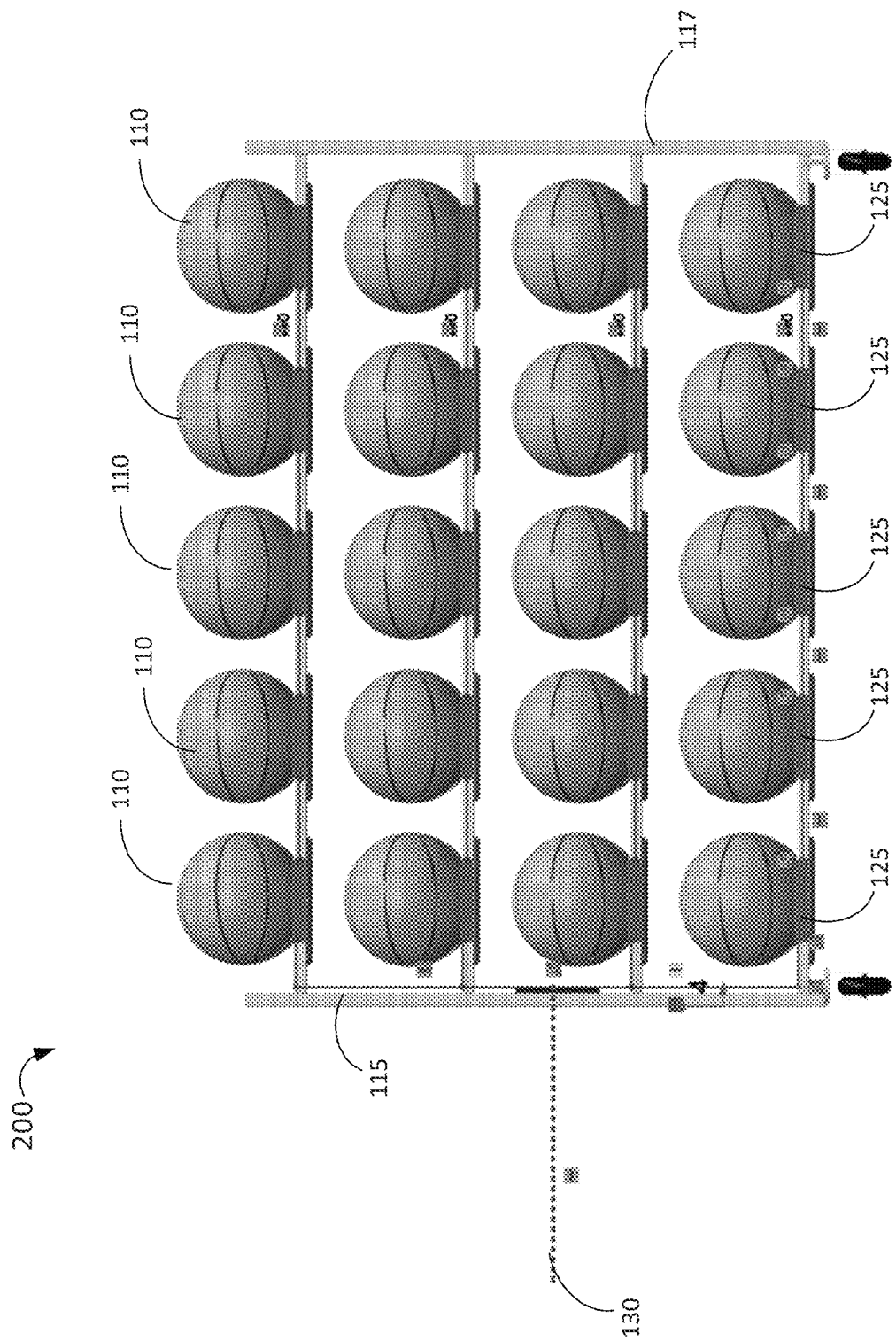
FIG. 2 shows a front view of a ball charging pod rack holding a total of twenty (20) basketballs on four rows of parallel horizontal bars.
Figure 3:
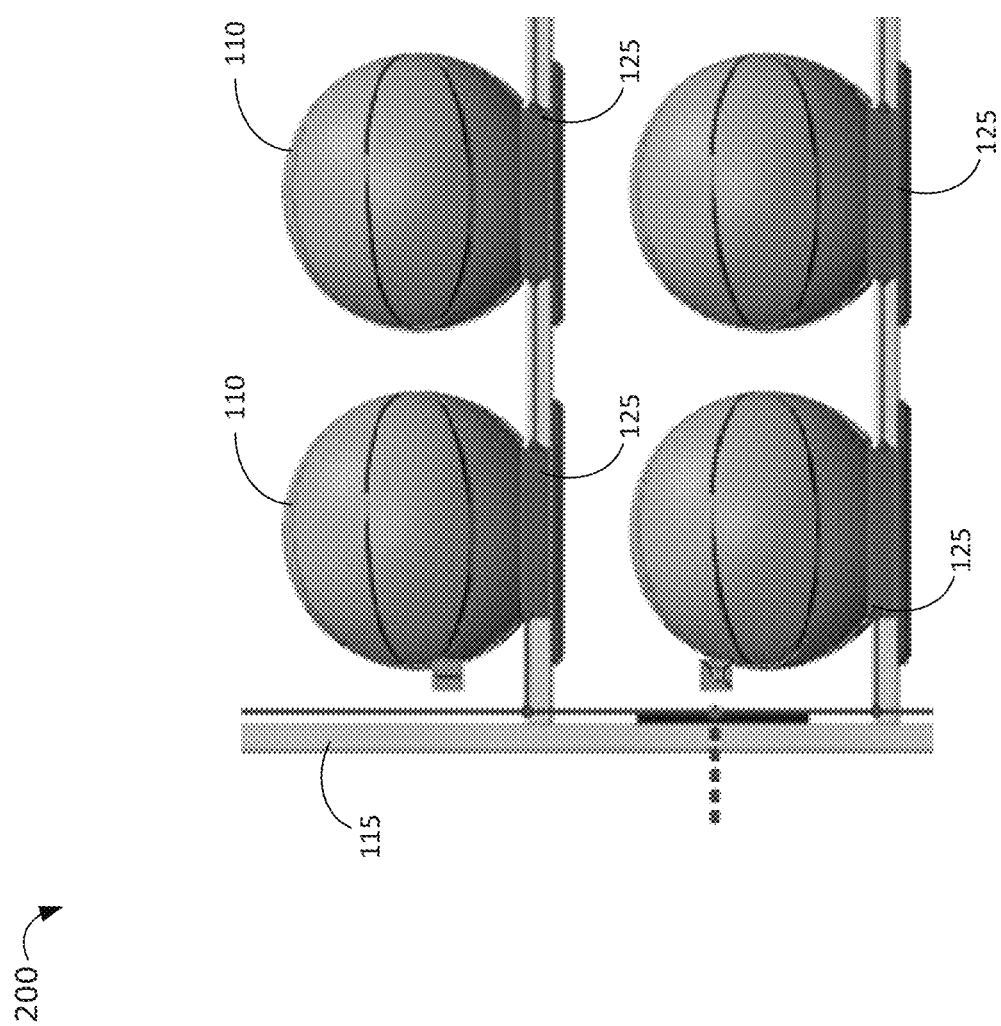
FIG. 3 shows a close-up view of a portion of the ball charging pod rack shown in FIG. 2.

FIG. 2 shows a front view of a ball charging pod rack 200 holding a total of twenty (20) basketballs on four rows of parallel horizontal bars 220. FIG. 3 shows a close-up view of a portion of the ball charging pod rack 205 shown in FIG. 2.

Figure 4A:
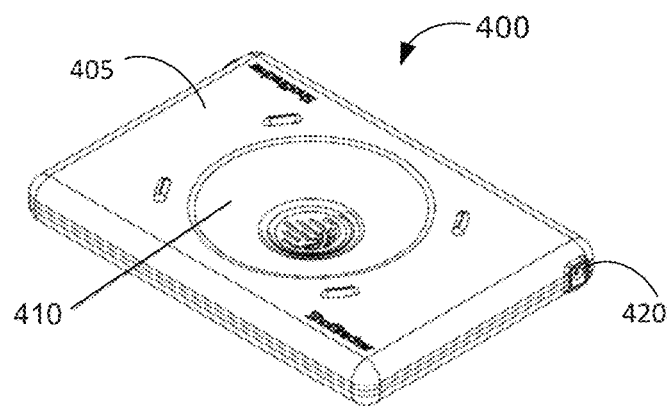
FIGS. 4A, 4B and 4C show, respectively, an isometric view, a top view and a side view of a wireless charging pod according to an embodiment of the present invention.
Figure 4B:
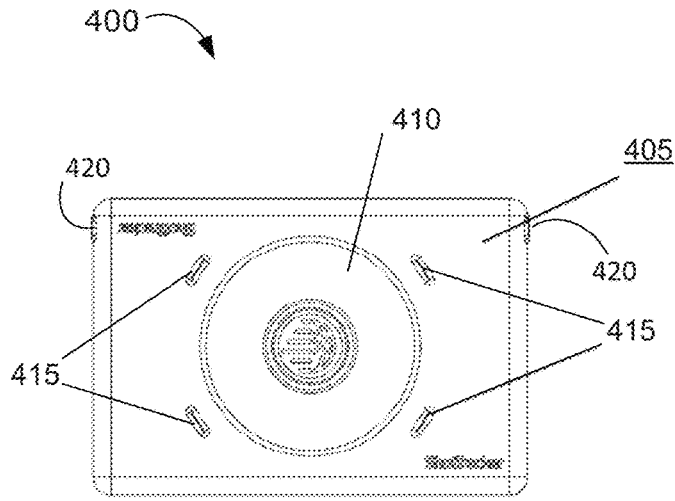
Figure 4C:
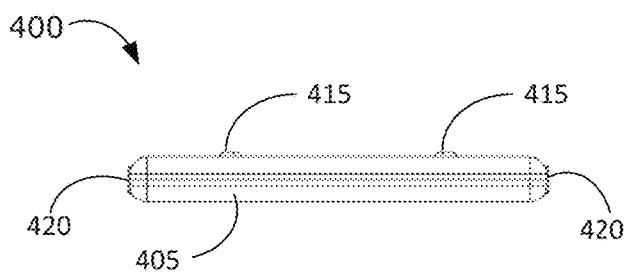

FIGS. 4A, 4B and 4C show, respectively, an isometric view, a top view and a side view of a wireless charging pod 405 according to an embodiment of the present invention. As shown best in FIGS. 4A and 4B, the wireless charging pod 400 comprises a substantially planar body 405 with a substantially hemispherical concave ball receptacle 410 on the top side of the body 405. The ball receptacle 410 is configured to receive and hold the bottom part of a basketball (not shown), which contains a rechargeable battery (also not shown) to be charged by the wireless charging pod 400, as will be explained in more detail below. The concave shape of the ball receptacle 410 is adapted to fit the bottom of a typical basketball so as to bring a receiving charging coil located inside the basketball as close as possible to a transmitting charging coil located inside the wireless charging pod 400. Surrounding the ball receptacle 410 are a set of four light-emitting diodes (LEDs) 415 configured, for example, to turn on (i.e., illuminate), turn off, blink and/or flash in accordance with a set of predetermined colors or patterns to provide an indication to a user that the rechargeable battery inside a basketball resting on the ball receptacle 410 of the wireless charging pod 400 is currently being charged, fully charged, etc. The LEDs 415 may also be configured to provide an indication to the user whether or not wireless communication components (such as a wireless transceiver) located inside the wireless charging pod 400 are currently communicating with wireless communication components located in the basketball The LEDs 415 may also be configured to provide an indication to the user (via colors, illumination or flash patterns) whether or not the receiving charging coil inside the basketball is properly aligned with the transmit charging coil inside the wireless charging pod 400. It is understood that the wireless charging pod 400 may comprise fewer or more LEDs without departing from the scope of the claimed invention, and those LEDs could be positioned in variety of different locations on the wireless charging pod 400. Wireless charging pod 400 may also include two power input/output connectors 420 and 422, which permit each wireless charging pod 400 to be used individually with a power cord, or daisy chained together with other wireless charging pods, as illustrated in FIGS. 2 and 3 described above.

Figure 5A:
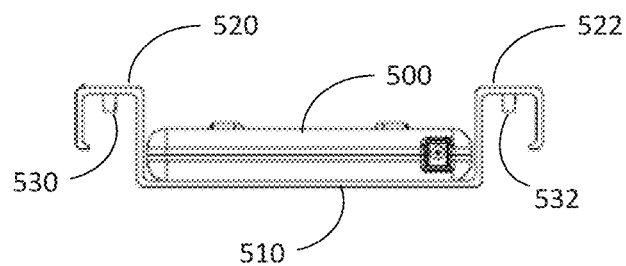
FIGS. 5A, 5B and 5C show, respectively, a side view, a top view and a front view of a mounting shelf, which may be used in certain embodiments of the present invention to mount the wireless charging pod on the parallel horizontal bars 120 of a compatible charging pod rack, such as the charging pod rack shown in FIG. 1.
Figure 5B:
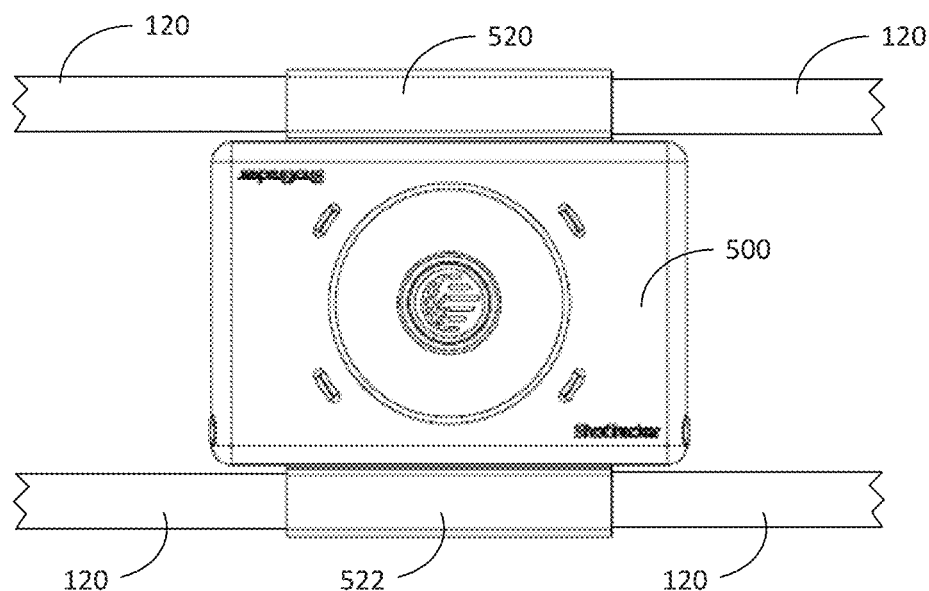
Figure 5C:
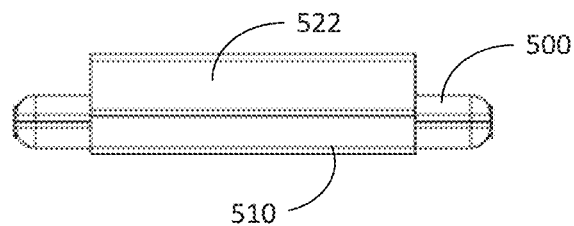

FIGS. 5A, 5B and 5C show, respectively, a side view, a top view and a front view of a mounting shelf 500, which may be used in certain embodiments of the present invention to mount the wireless charging pod 500 on the parallel horizontal bars 120 (not shown in FIGS. 5A, 5B and 5C) of a compatible charging pod rack, such as the charging pod rack 100 shown in FIG. 1. As illustrated best in FIG. 5A, the mounting shelf 500 preferably includes a base area 510 that is connected to a pair of inverted U-shaped arms 520 and 522 located on opposite sides of the base area 510. The base area 510 and the arms 520 and 522 are together adapted to receive and hold the bottom and sides of the wireless charging pod 500, so that that the wireless charging pod 500 is securely and removably suspended between two parallel bars 120 (shown in FIG. 5B) on the ball charging pod rack 100. In some embodiments, the arms 520 and 522 may also include a pair of studs 530 and 532 configured to be inserted into the receiving holes located on the top sides of the parallel horizontal bars 120 of the ball charging pod rack 100.

Figure 6A:
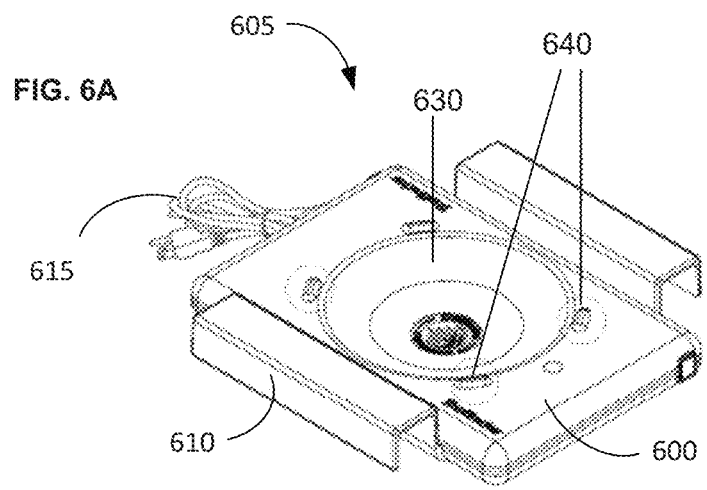
FIG. 6A shows an isometric view of a wireless charging pod assembly, comprising a wireless charging pod, a mounting shelf and a 120V AC power cord.
Figure 6B:
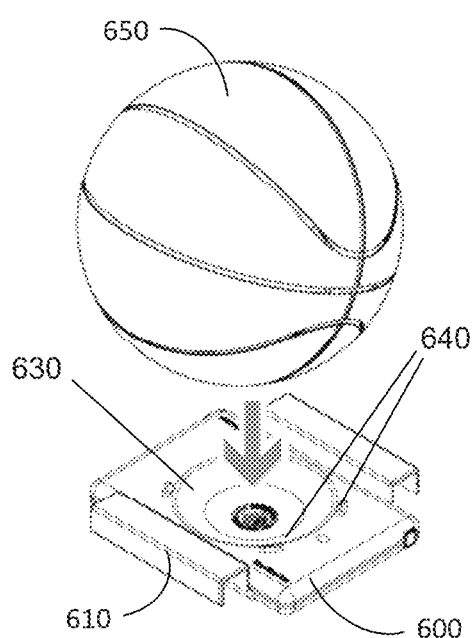
FIGS. 6B and 6C show diagrams illustrating how a sporting device (in this case a basketball 650) should be placed on top of the receptacle 630 of the charging pod assembly in order to start recharging the rechargeable battery inside the basketball.
Figure 6C:
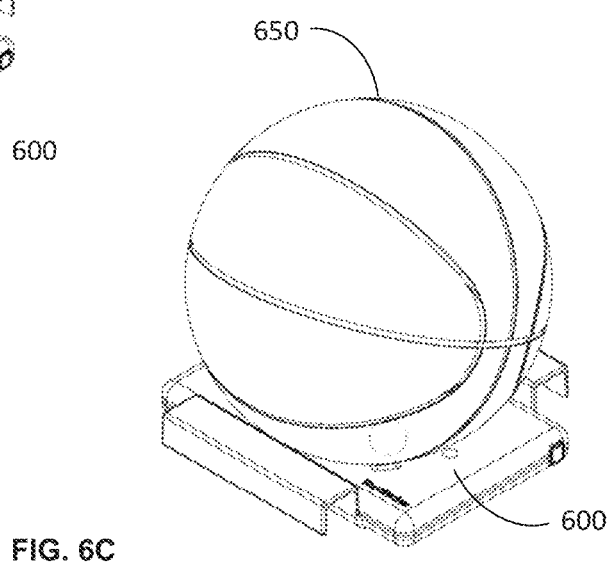

FIG. 6A shows an isometric view of a wireless charging pod assembly 605, comprising a wireless charging pod 600, a mounting shelf 610 and a 120V AC power cord 615. A concave-shaped receptacle 630 is provided to help hold a spherical shaped game device, such as basketball, soccer ball or baseball, on top of the wireless charging pod assembly 605. FIGS. 6B and 6C show diagrams illustrating how a sporting device (in this case a basketball 650) should be placed on top of the receptacle 630 of the charging pod assembly 605 in order to start recharging the rechargeable battery inside the basketball 650. As illustrated in FIGS. 6A, 6B and 6C, four LEDs 640 are provided around the receptacle 630 to indicate to the user the current charging status of the charging pod assembly 605 and/or basketball 650 when the charging pod assembly 605 is plugged into a power source, such as a 120V power outlet, and an authorized basketball is put on top of the receptacle 630. The colors and patterns of light emitted by the LEDs may be selected to convey useful information about the status of the charging operation.

For example, in some embodiments, the LEDs may be configured to emit:

1) a steady (i.e., non-blinking) amber light if the basketball 650 resting on the receptacle 630 of the wireless charging pod assembly 600 is properly aligned and actively recharging its battery;
2) a pulsing red light if the game device is resting on the receptacle 630, but is misaligned to such an extent that it is not recharging the battery;
3) a solid red light if there is critical error in the charging operation that requires the charging pod 600 to be reset by removing the basketball 650 from the receptacle 630, waiting for a specified number of seconds (e.g., 5 seconds), and then replacing the basketball 650 on the receptacle 630;
4) a solid green light if the rechargeable battery in the basketball 605 is fully recharged; and
5) a solid blue light if the wireless charging pod 600 is ready to receive and charge a basketball 650

Figure 7A:
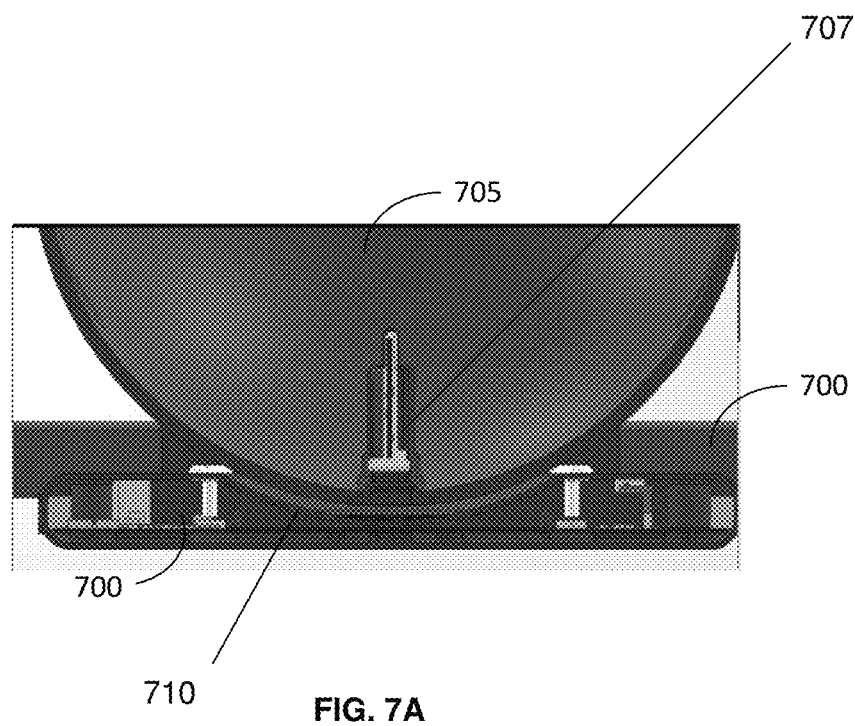
FIG. 7A shows a cross-sectioned diagram of wireless charging pod and a basketball, wherein the basketball 705 is resting on in the ball receptacle 710 of the wireless charging pod.

FIG. 7A shows a cross-sectioned diagram of wireless charging pod 700 and a basketball 705, wherein the basketball 705 is resting on in the ball receptacle 710 of the wireless charging pod 700. Embedded inside the basketball 705 is an assembly 707 that contains, among other things, a sensor, a charge receiving coil and a rechargeable battery (the sensor, charge receiving coil and battery are not shown in detail). The receptacle 710 is configured to receive and hold the basketball 705 so that the charge receiving coil (not shown) in the basketball 710 is properly aligned with, and therefore within range of the electromagnetic flux (not shown) produced by the activation of a charge transmitting coil located the inside of the wireless charging pod 700.

Figure 7B:
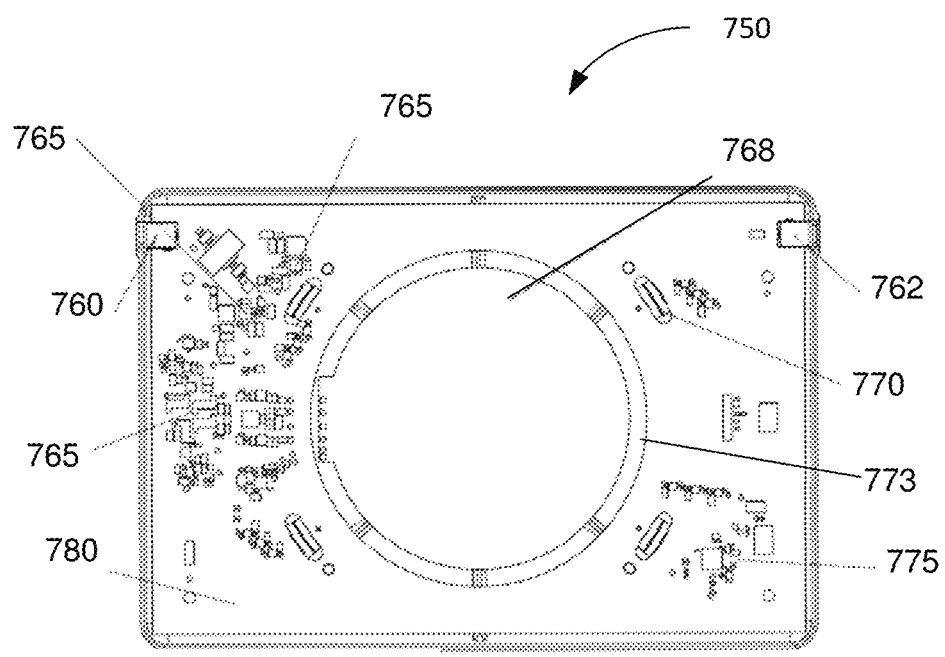
FIG. 7B shows an exemplary printed circuit board 750 that may be used inside a wireless charging pod, such as the wireless charging pod shown in FIG. 7A, in some embodiments of the present invention.

FIG. 7B shows an exemplary printed circuit board 750 that may be used inside a wireless charging pod, such as the wireless charging pod 700 shown in FIG. 7A, in some embodiments of the present invention. As illustrated by FIG. 7B, the circuit board 750 preferably includes a direct current (DC) in connector 760, a direct circuit (DC) power out connector 762, several power circuits 765, a charge transmission coil 773, four (or more) LED indicators 770, a Bluetooth circuit 775 and a wireless power printed circuit board (PCB) assembly 780.

Notably, unlike the printed circuit boards of conventional wireless charging devices, the printed circuit board 750 of the present invention includes a relatively large hole 768 in it, which is configured to accommodate the semi-spherical shape of the outer surface of the basketball 705 whenever the basketball 705 is placed on the basketball receptacle of charging pod 700. The charge transmission coil 773 on the printed circuit board 750 surrounds the hole 768 in the printed circuit board 750, which permits at least a portion of a basketball 705 to be seated below the plane of the printed circuit board 750 and charge transmission coil 773, and thereby decreases the distance between the charge receiving coil (not shown in detail in FIG. 7) located in the basketball 705 and charge transmission coil 773 located in the charging pod 700.

Reducing the distance between the charge transmission coil 773 and the charge receiving coil expands the volume of the envelope in space where the charge receiving coil in the basketball 705 may be located and still be within good range of the electromagnetic field produced by the charge transmission coil 773 of the wireless charging pod 700. Thus, cutting a hole 768 in the plane of the printed circuit board 750 expands the size of the charging "sweet spot" for the position and orientation of the basketball 705's charge receiving coil, which significantly reduces the charging time, as well as the number and likelihood of charging errors and failures caused by slight misalignments between the wireless charging pod 700 and the basketball 705. Suitably, the basketball receptacle located on top of the charging pod 700 may include a concavity that extends at least partway through the hole 768 in the printed circuit board 750 to further accommodate ensuring that at least a portion of the spherical shape of the basketball 705 can fall below the plane of the printed circuit board 750 and charge transmission coil 773 in the wireless charging pod 700. Although the hole 768 shown in FIG. 7 is circular in shape, it will be understood that the hole (or cut-out) also may be configured to accommodate a variety of different shapes associated with non-spherical game devices, such as a football or hockey puck, in order to permit the charge receiving coils in such non-spherical devices to be positioned closer to the charge transmission coil 773 in the wireless charging pod 700.

Figure 8:
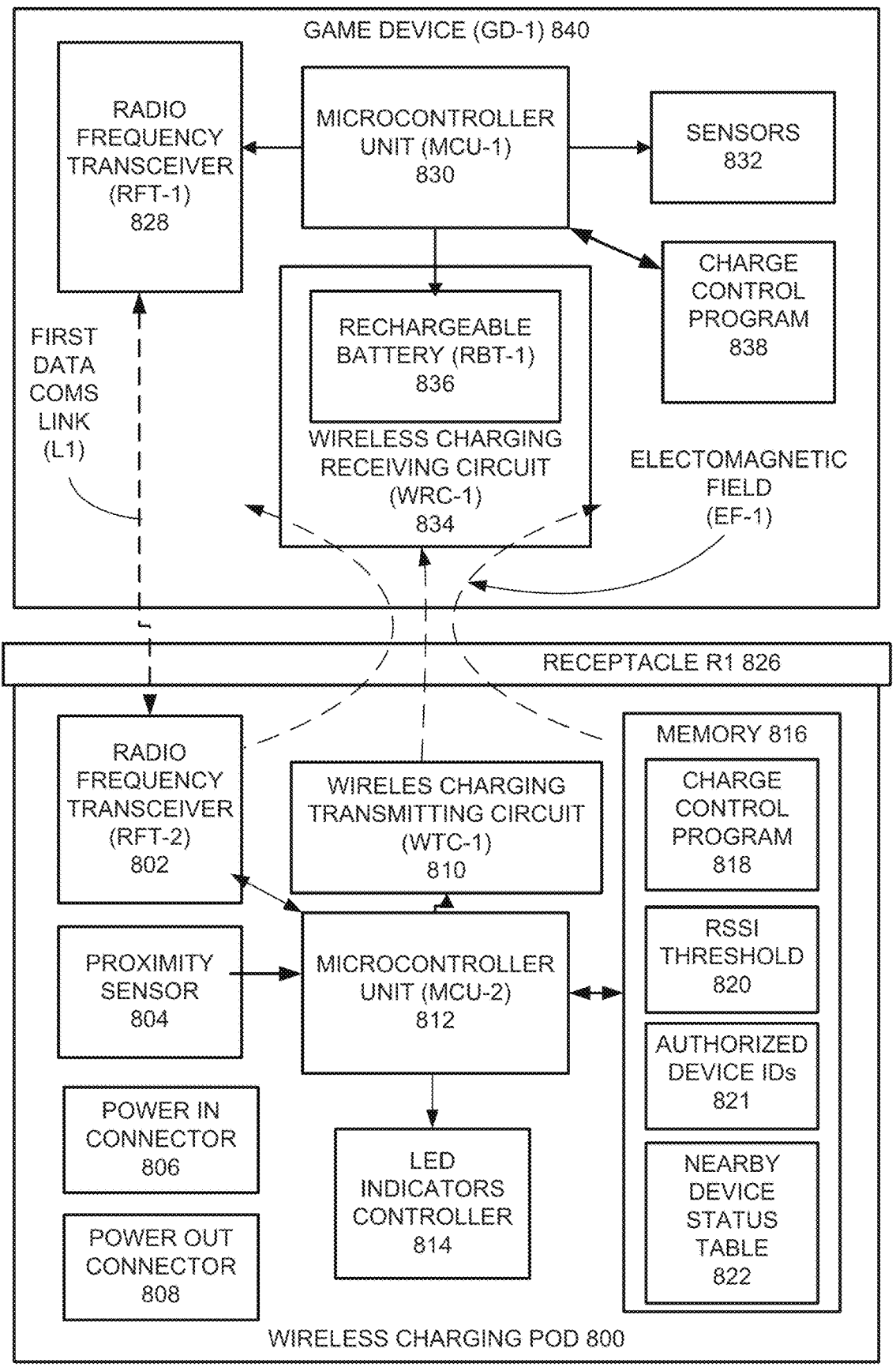
FIG. 8 shows a block diagram illustrating, by way of example, the physical and logical components of a wireless charging pod organized and configured to operate according to one embodiment of the present invention, as well as a block diagram of a nearby game device containing a rechargeable battery and a wireless charging receiving circuit.

FIG. 8 shows a block diagram illustrating, by way of example, the physical and logical components of a wireless charging pod 800 organized and configured to operate according to one embodiment of the present invention. FIG. 8 also shows a block diagram of a nearby game device GD-1 that contains a rechargeable battery RBT-1 and a wireless charging receiving circuit WRC-1, wherein the wireless charging receiving circuit WRC-1 in the game device GD-1 is configured to charge the rechargeable battery RBT-1 when electrical current is made to flow through the wireless charging receiving circuit WRC-1 by electromagnetic induction. For purposes of the discussion that follows, the game device GD-1 may comprise any one of many different types of sporting or gaming devices, tools or equipment that include rechargeable batteries that periodically require recharging. The game device GD-1 may comprise, for example, a football, a volley ball, a soccer ball, a tennis ball or racket, a bowling ball, a baseball or a hockey puck or stick, a lacrosse ball or stick, a tennis racket, to name just few examples of game devices that could be constructed with internal electronics and rechargeable batteries. The game device GD-1 may also comprise any articles of clothing, headwear or footwear typically worn during games of sport, such as uniforms, cleats, shoes, pads, bands, hats and helmets worn or used for basketball, baseball, football, soccer, etc.

The wireless charging pods 400, 500, 600, 700 and 800 shown in FIGS. 4, 5, 6, 7 and 8, respectively, may sometimes be referred to in practice as a "wireless battery charger," or a "wireless ball charger," or a "charging device," or more simply as, a "charger." An individual wireless charging pod of the present invention may be used to charge a single game device, one device at a time. But the wireless charging pod 800 may be one of a plurality of wireless charging pods that are physically and electronically connected to each other or attached to a rack or other multiple game device charging apparatus, so that a plurality of game devices may be recharged simultaneously by a respective plurality of wireless charging pods on the same rack or apparatus. As will be described in more detail below, when two or more game devices are within range of a particular wireless charging pod 800, the programs and algorithms of some embodiments of the present invention may advantageously include processors, programming instructions, and/or switches configured to automatically determine which one of the nearby game devices is in direct contact with (or closest to) the wireless charging pod 800, and to automatically select and wirelessly pair itself to the correct game device, and to automatically activate and deactivate the charging circuits at the appropriate times so that the correct game device GD-1 is recharged. Accordingly, embodiments of the present invention may be beneficially configured to avoid situations where energy and effort is wasted, and charging operations fail, because a particular wireless charging pod, such as wireless charging pod 800, erroneously attempts to connect to and charge nearby game devices that are located on (and therefore should be recharged by) a different wireless charging pod. Wireless charging pods configured to operate in accordance with embodiments of the present invention also include processors, data tables and flags that may be used to automatically avoid attempting to recharge rechargeable wireless devices that come into their wireless recharging range if those wireless devices are not specifically authorized for charging by the wireless charging pod.

As shown in FIG. 8, the wireless charging pod 800 comprises a wireless charging transmitting circuit WTC-1 810, a microcontroller unit MCU-2 812, a power in connector 806, a power out connector 808, a proximity sensor 804 and a memory 816. Typically, the memory 816 stores a charge control program 818, an RSSI threshold 820, and a Nearby Device Status Table 822. The game device GD-1 840 includes a different microcontroller unit MCU-1 830, a wireless charging receiving circuit WRC-1 834, a rechargeable battery RBT-1 838, a charge control program 838 and one or more sensors 832. Other hardware or logical components, not shown in FIG. 8, such as antennas, proximity sensors and assemblies, may also be included in the wireless charging pod 800, the game device GD-1 840, or both of them.

The game device GD-1 840 and the wireless charging pod 800 both include radio frequency transceivers, which are labeled in FIG. 8 as RFT-1 and RFT-2, respectively. Typically, but not necessarily, the radio frequency radios RFT-1 and RFT-2 communicate using a Bluetooth radio frequency protocol. The radio frequency radio transceiver RFT-1 in the game device GD-1 840 periodically sends out an advertising signal to advertise its presence to other radio transceivers in the area. The advertisement includes a unique user identifier (UUID) or media access control (MAC) address, which the wireless charging pod 800, operating under the control of the charge control program 818, searches the UUID in an authorized device identification (ID) table 821 in the memory 816 to confirm that the game device GD-1 that sent the advertisement is authorized for charging by the wireless charging pod 800. If the UUID or MAC address is not found in the Authorized Device Identification Table 821, then the wireless charging pod may be configured to ignore the advertisement and the game device GD-1 840.

On the other hand, if the UUID is found in the Authorized Device Identification Table 821, then the wireless charging pod 800 receives the advertisement signal of an authorized game device GD-1, the microcontroller unit MCU-2 810 in the wireless charging pod 800, operating under the control of the charge control program 818, calculates a signal strength of the received signal and stores it in the Nearby Device Status Table 822 of the memory 818 as a received signal strength indication (RSSI). The magnitude of the RSSI is proportional to the distance between the game device GD-1 840 and the wireless charging pod 800. RSSI measurements represent the relative quality of a received signal on a device. RSSI indicates the power level being received after any possible loss at the antenna and cable level. The higher the RSSI value, the stronger the signal. When measured in negative numbers, the number that is closer to zero usually means a better signal, and therefore more reliable communication. As an example, −25 dB is considered to be a strong signal, −50 dB is considered a good signal, −61 dB—is considered a reliable signal, and −100 dB is no signal at all. In some embodiments, the charge control program 818 is configured to use data contained in the advertisement to determine the magnitude of the RSSI by calling one or more subroutines included in one or more standard Bluetooth software libraries.

When the RSSI of the advertisement is equal to or greater than a predetermined threshold, the charge control program 818 is configured to cause the microcontroller unit MCU-2 and the radio frequency transceiver RFT-2 on the wireless charging pod 800 to automatically establish a first data communications link L1 (e.g., a Bluetooth paired connection) between the radio frequency transceiver RFT-1 in the game device GD-1 and the radio frequency transceiver RFT-2 in the wireless charging pod 800. The value selected to use as the RSSI threshold is a matter of choice for the system programmer or manufacturer of the wireless charging pod 800. Typical values for the RSSI are −35 dB to −20 dB when the game device GD-1 is close enough to the wireless charging pod 800 to activate the pairing and charging operation, and −90 dB or less when the game device GD-1 is too far away from the wireless charging pod 800 that trying to pair with and recharge the game device GD-1 would not be desirable or efficient.

The microcontroller unit MCU-1 in the game device GD-1 is communicatively connected to both a wireless charging receiving circuit WRC-1 in the game device GD-1 and the radio frequency transceiver RFT-1 in the game device GD-1. After the radio frequency transceivers RFT-1 and RFT-2 are paired and communicating with each other, a microcontroller unit MCU-2 connected to the radio frequency transceiver RFT-2 in the wireless charging pod 800 monitors the RSSI of the signal coming from the radio frequency transceiver RFT-1 in the game device GD-1 to determine when the signal strength coming from the radio frequency transceiver RFT-1 in the game device GD-1 exceeds a predetermined signal strength threshold (such as −35 db, for example). When the predetermined signal strength threshold is exceeded, it means the game device GD-1 is sufficiently close enough to the wireless charging pod 800 for reliably energizing a wireless charging receiving circuit WRC-1 connected to the rechargeable battery RBT-1 in the game device GD-1 using the wireless charging transmitting circuit WTC-1 in the wireless charging pod 800. Accordingly, the microcontroller unit MCU-2 in the wireless charging pod 800 activates the wireless charging transmitting circuit WTC-1 in the wireless charging pod 800 so that the wireless charging transmitting circuit WTC-1 starts producing an electromagnetic field EF-1 to energize the receiving coil and wireless charging receiving circuit WRC-1 in the game device GD-1, and thereby starts recharging the rechargeable battery RBT-1 in the game device GD-1.

Operating under the control of the charge control program 838 in the game device GD-1, the microcontroller unit MCU-1 in the game device GD-1, together with the wireless charging receiving circuit WRC-1, detects when the wireless charging receiving circuit WRC-1 in the game device GD-1 starts receiving charge energy (electromagnetic pulses) generated by the wireless charging transmitting circuit WTC-1 in the wireless charging pod 800 and, responsive to the detection of the charging energy, generates and sends a message over the first data communications link L1 (typically a Bluetooth channel) to the radio frequency transceiver RFT-2 in the wireless charging pod 800, the message indicating that the rechargeable battery RBT-1 in the game device GD-1 is currently being recharged. When the rechargeable battery RBT-1 in the game device GD-1 is fully charged, the microcontroller unit MCU-1, operating under the control of the charge control program 838, generates and sends to the wireless charging pod 800 a message indicating that the rechargeable battery RBT-1 in the game device GD-1 is fully recharged. After receiving the "currently charging" message from the game device GD-1, the charge control program 818 in the wireless charging pod 800 is configured to keep the wireless charging transmitting circuit WTC-1 in the wireless charging pod 800 turned on (and transmitting energy) until it receives the message from the game device GD-1 indicating that the rechargeable battery RBT-1 in the game device GD-1 is fully charged.

For instance, when the microcontroller unit MCU-2 in the game device GD-1, operating under the control of the charge control program 838, detects that the rechargeable battery RBT-1 in the game device GD-1 is fully recharged, the microcontroller unit MCU-1 generates and transmits over the first data communications link L1 between the radio frequency transceivers RFT-1 and RFT-2 an "end of charge" message (or signal). Upon receiving the end of charge message or signal from the game device GD-1's radio frequency transceiver RFT-1, the microcontroller unit MCU-2 in the wireless charging pod 800, operating under the control of the charge control program 818 in the wireless charging pod 800, is configured to cause the microcontroller unit MCU-2 to deactivate the wireless charging transmitting circuit WTC-1 in the wireless charging pod 800 to deactivate the wireless charging transmitting circuit WTC-1 in the wireless charging pod 800. This terminates the electromagnetic flux energizing the wireless charging receiving circuit WRC-1 in the game device GD-1, which causes the rechargeable battery RBT-1 in the game device GD-1 to stop recharging.

If the microcontroller unit MCU-2 in the wireless charging pod 800 activates the wireless charging transmitting circuit WTC-1 in the wireless charging pod 800 and does not subsequently receive a message over the first data communications link L1 confirming that the electromagnetic field EF-1 produced by the wireless charging transmitting circuit WTC-1 has been detected by the wireless charging receiving circuit WRC-1 in the game device GD-1, this condition usually means one of two things. The first possibility is that the game device GD-1 is out of the range of the wireless charging transmitting circuit WTC-1 (despite the fact that the RSSI threshold was exceeded). The second possibility is that the game device GD-1 is not positioned or oriented correctly (i.e., misaligned) on the receptacle R1 828 of the wireless charging pod 800. When either of these conditions occurs, the microcontroller unit MCU-2 in the wireless charging pod 800 deactivates the wireless charging transmitting circuit WTC-1 so that no energy is wasted generating an electromagnetic field EF-1 that is not being received and used by the game device GD-1 to recharge rechargeable battery RBT-1. If the problem is a misalignment, then the microcontroller unit MCU-2 in the wireless charging pod 800 preferably activates the LED indicators controller 814 to cause the LED indicators (not shown in FIG. 8) to flash or change colors to provide a signal to the user that the game device GD-1 needs to be realigned. See the flow diagrams and accompanying descriptions for FIGS. 10 and 12 (wireless charging pod algorithms) and FIG. 11 (game device algorithm).

The distance between the charge transmitting coil in the wireless charging transmitting circuit WTC-1 810 of the wireless charging pod 800 and the receiving coil in the wireless charging receiving circuit WRC-1 834 of the game device GD-1 typically needs to be about 1 inch for the game device GD-1 to recharge in an efficient and timely manner. However, in some environments, the process for measuring the signal strength (RSSI) of the Bluetooth signal emanating from the game device GD-1 may only be capable of discriminating distance to about 1 foot. So, the RSSI measuring procedure may not be accurate enough to confirm that the coils in the wireless charging circuits are within one inch of each other. This is the reason that the game device GD-1 is preferably configured to detect that the rechargeable battery is recharging and, if so, periodically send the "currently charging" confirmation signal over the radio frequency (e.g., Bluetooth) channel L1, and the wireless charging pod 800 periodically re-checks to confirm that the "currently charging" confirmation message is still being received on the data communication channel L1 o ensure the game device GD-1 has detected the electromagnetic field produced by the charging circuit on the rack and is charging. Note that this step could be performed asynchronously.

In case the game device GD-1 is removed from the receptacle R1 828 and taken out of range of the wireless charging pod 800, or the game device GD-1 somehow gets rotated on the receptacle R1 828 so that the wireless charging receiving circuit WRC-1 834 in the game device GD-1 is too far away from the wireless charging transmitting circuit WTC-1 810 in the wireless charging pod 800, the wireless charging pod 800 also periodically re-checks the RSSI. If the RSSI drops below the predetermined RSSI threshold 820 in the memory 816, then the microcontroller unit MCU-2 812, operating under control of the charge control program 818 in the wireless charging pod 800, deactivates the wireless charging transmission circuit WTC-1.

Typically, the wireless charging pod 800 monitors the RSSI of multiple game devices in its vicinity, and then establishes a Bluetooth communications link to the game devices if the game device is authorized to be charged by the wireless charging pod 800 and the RSSI threshold is met or exceeded. This allows multiple wireless charging pods to monitor the same game devices. Generally, and especially in memory- or resource-constrained devices, once a Bluetooth communications link is established between a particular wireless charging pod and a particular game device, no other wireless charging pods in the network can connect to that particular game device and start charging it.

The wireless charging pod 800 (or the rack to which the wireless charging pod 800 may be attached) preferably includes a digital display screen and/or a set of LEDs, for example, which may be configured to display error messages to users. For instance, if the wireless charging pod 800 turns on the wireless charging transmitting circuit WTC-1 810 because the RSSI of a nearby game device GD-1 meets or exceeds the specified RSSI threshold 820, but then fails to receive a "currently charging" confirmation message from the game device GD-1, then a message could be displayed on the digital display screen, or the LEDs could be configured to flash or turn red, for example, telling the user that the game device is not properly aligned on the receptacle R1 826. This might occur, for example, if the user places the game device GD-1 on the receptacle R1 826 upside down, so that the wireless charging receiving circuit WRC-1 in the game device GD-1 is on the opposite side of the game device GD-1 from the wireless charging pod 800's receptacle R1 826. Conversely, if the user places the game device GD-1 on the receptacle R1 826 so that it is properly aligned and the wireless charging pod 800 does receive the "currently charging" message from the game device GD-1, then the display screen may be configured to display a "charging" message to the user. Alternatively, or in addition, the LEDs on the receptacle R1 826 may be configured to turn blue or amber and/or flash to indicate that the device is currently charging. Suitably, the LEDs may also be configured to change color to green when the rechargeable battery RBT-1 is fully charged and the device is ready for use in a game of sport.

Completely Drained Battery Situations

If the rechargeable battery RBT-1 in the game device GD-1 is completely drained, it is incapable of sending out Bluetooth advertisements to be received by the wireless charging pod 800. When this happens, the wireless charging pod 800 will not be able to detect through the radio frequency channel L1 that the game device GD-1 is present, and therefore will not activate the wireless charging circuit WTC-1 to produce the electromagnetic field to energize the wireless charging receiving circuit WTC-1 and start recharging the rechargeable battery RBT-1. To address this situation, embodiments of the present invention may be optionally configured to automatically turn on the wireless charging transmission circuit WTC-1 for a few seconds every few minutes (e.g., for 10 seconds out of every 1000 seconds), even when the wireless charging pod 800 has not received an advertisement to tell the wireless charging pod 800 that the rechargeable game device GD-1 is nearby and in need of a recharge. These periodic 10-second pulses of the wireless charging transmission circuit WTC-1 will typically be sufficient to energize the wireless charging receiving circuit WRC-1 of the game device GD-1, such that the rechargeable battery RBT-1 of the game device GD-1 will acquire a sufficient amount of stored energy to resume sending out the advertising signals over the first data communications link L1, as well as the charging confirmation messages required to keep the wireless charging transmission circuit WTC-1 of the wireless charging pod 800 continuously activated (as opposed to periodically activated) until the game device is fully charged, or otherwise removed from the range of the wireless charging transmission circuit WTC-1 of the wireless charging pod 800.

In other embodiments, and as shown in FIG. 8, the wireless charging pod 800 may be additionally equipped with a mechanical switch or pressure sensor, located on or associated with the receptacle, which is configured to detect the presence of the game device GD-1, despite the fact that the game device GD-1 is not advertising its presence via the radio frequency transceiver RFT-1. When the mechanical switch or the pressure sensor is engaged, the microcontroller unit MCU-1, operating under the control of the charge control program 818, may be configured to periodically activate the wireless charging transmission circuit WTC-1 for a predetermined time period (e.g., for 5 seconds). For example, if the the mechanical switch or the pressure sensor is activated indicating that something is resting on the receptacle R1, the wireless charging pod 800 may be configured to turn on the wireless charging transmitting circuit WTC-1 for five (5) seconds of every minute until the mechanical switch or the pressure sensor is no longer engaged.

In still other embodiments, a printed circuit board (PCB) inside the wireless charging pod 800 may be equipped with a proximity sensor 804 that uses optical technology to detect that an object is on (or very close to) the top of the receptacle R1 826. When the proximity sensor 804 is activated, the wireless charging pod 800 may be configured to periodically activate the wireless charging transmission circuit WTC-1 for a predetermined period (e.g., for 2 seconds every minute) until the proximity switch is no longer activated or until the rechargeable battery RBT-1 in the game device GD-1 is sufficiently recharged to permit the game device to resume periodically broadcasting advertisements that can be detected and used by the wireless charging pod 800 to establish communication over the first data communications link L1 (e.g., a reliable Bluetooth connection).

Algorithm #1 for Controlling Charge Operations on the Wireless Charging Pod

Figure 9:
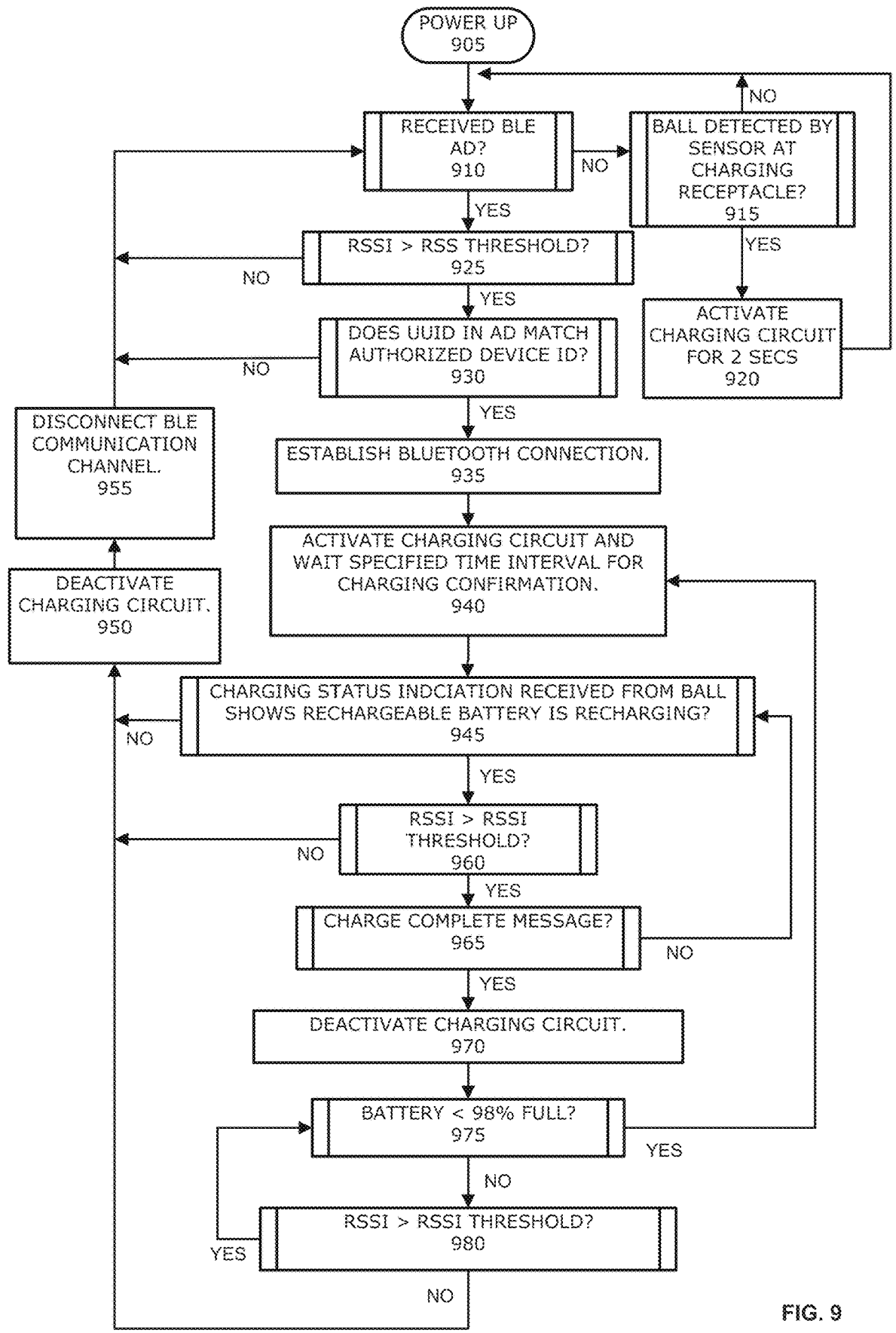
FIG. 9 shows a flow diagram illustrating by way of example, the steps performed by the wireless charging pod to control recharging operations for a nearby game device according to some embodiments of the present invention.

FIG. 9 shows a flow diagram illustrating by way of example, some of the steps performed by the wireless charging pod to control recharging operations for a nearby game device according to some embodiments of the present invention. Typically, these steps are carried out by microprocessor unit in the wireless charging pod, the microprocessor unit operating under the control of program instructions in a charge control program, such as the charge control program 818 in FIG. 8, executed in a volatile memory area on the wireless charging pod.

As shown in FIG. 9, the control program begins at step 905 by powering up the wireless charging pod. Next, at step 910, the program checks to see whether it has received, via its radio frequency transceiver, a Bluetooth low energy (BLE) advertisement signal from a nearby game device, such as a basketball. If not, then the program proceeds to step 915, where it checks to see if a ball is detected at the charging receptacle. If a BLE advertisement has not been received, but a basketball has been detected on the receptacle, then the basketball on the receptacle probably has a rechargeable battery that has been completed drained of power, which would explain why the basketball is not broadcasting a BLE advertisement signal. To provide the battery in the detected basketball with enough power to resume broadcasting BLE advertisements, the control program activates the charging circuit in the wireless charging pod for 2 seconds (see step 920) before returning to step 910 to again check to see if it has received a BLE advertisement signal. If not, and a ball is still being detected on the receptacle, then the control program will continue looping though steps 910, 915 and 920 to periodically activate the charging circuit for 2 seconds over and over again until the detected basketball finally acquires enough power to resume broadcasting BLE advertisements.

If it is determined at step 910 that a BLE advertisement has been received, then the control program next calculates the received signal strength indication (RSSI) for the advertisement and then determines whether the calculated value of the RSSI is greater than a specified RSSI threshold, such as −35 dB. Step 925. If the RSSI threshold is exceeded, then the control program will next determine, in step 930, whether a universally unique identifier (UUID) embedded in the BLE advertisement matches any one of the UUIDs stored in a table stored in the memory of the wireless charging pod. If the UUID is not found in the table, then the nearby game device (basketball) that provided the UUID is not authorized for recharging by this charging pod, in which case the basketball will be ignored, and control is passed back to step 910, where the charging pod begins to listen for other BLE advertisements again.

On the other hand, if the UUID in the BLE advertisement does match a UUID in the memory table of the wireless charging pod, then the control program will establish a Bluetooth connection with the basketball (step 935), activate the charging circuit, enable notifications and wait a specified time interval for the basketball to deliver a message over the Bluetooth connection confirming that the basketball is detecting and using the electromagnetic field produced by the charging circuit to recharge the battery in the basketball (steps 940 and 945). If the confirmation is never received from the basketball, then the charge control program will deactivate the charging circuit to avoid wasting energy (step 950), disconnect the BLE communication channel (step 955), and again return to step 910 to start the process of monitoring the airwaves for BLE advertisements all over again.

If it is determined in step 945 that a confirmation has been received from the basketball, and the basketball is recharging due to the activation of the charging circuit by the control program, then the charge control program will again compare the current RSSI for the basketball with the RSSI threshold to make sure the RSSI still exceeds the RSSI threshold (indicating that the basketball is still in range of the electromagnetic field). If the current RSSI does not exceed the RSSI threshold, then the basketball has probably been moved out of range of the charging circuit and the charge control program will deactivate the charging circuit to avoid wasting energy (step 950), disconnect the BLE communication channel (step 955), and again return to step 910 to start the process of monitoring the Bluetooth airwaves for BLE advertisements all over again.

If the current RSSI for the basketball still exceeds the RSSI threshold, then the control program next checks to see if a "charge complete" message has been received from the basketball. If not, then the program loops back to step 945, where the system again determines, based on messages received (or not received) from the basketball, whether the battery in the basketball is currently recharging. When the "charge complete" message is received at step 965, the program deactivates the charging circuit (see step 970) and then enters a loop where it repeatedly queries the basketball over the Bluetooth connection to determine when the charge on the battery of the basketball falls below 98% (step 975) and also attempts to verify that the current RSSI for the basketball remains greater than the RSS threshold (indicating the basketball is still within range). The control program will continuously loop between steps 975 and 980 until the battery is no longer at least 98% full or the RSSI drops below the RSSI threshold. When the battery power drops below 98%, the control program will return to step 940, where it will again perform the steps of activating the charging circuit, looking for a confirmation that the battery is being charged by the electromagnetic field produced by the activated electromagnetic field, and then, while the charging circuit remains on, periodically confirming that the current RSSI remains above the specified RSSI threshold (the ball is close enough to the charger to be recharged) and the battery is at least 98% full to capacity.

Figure 10:
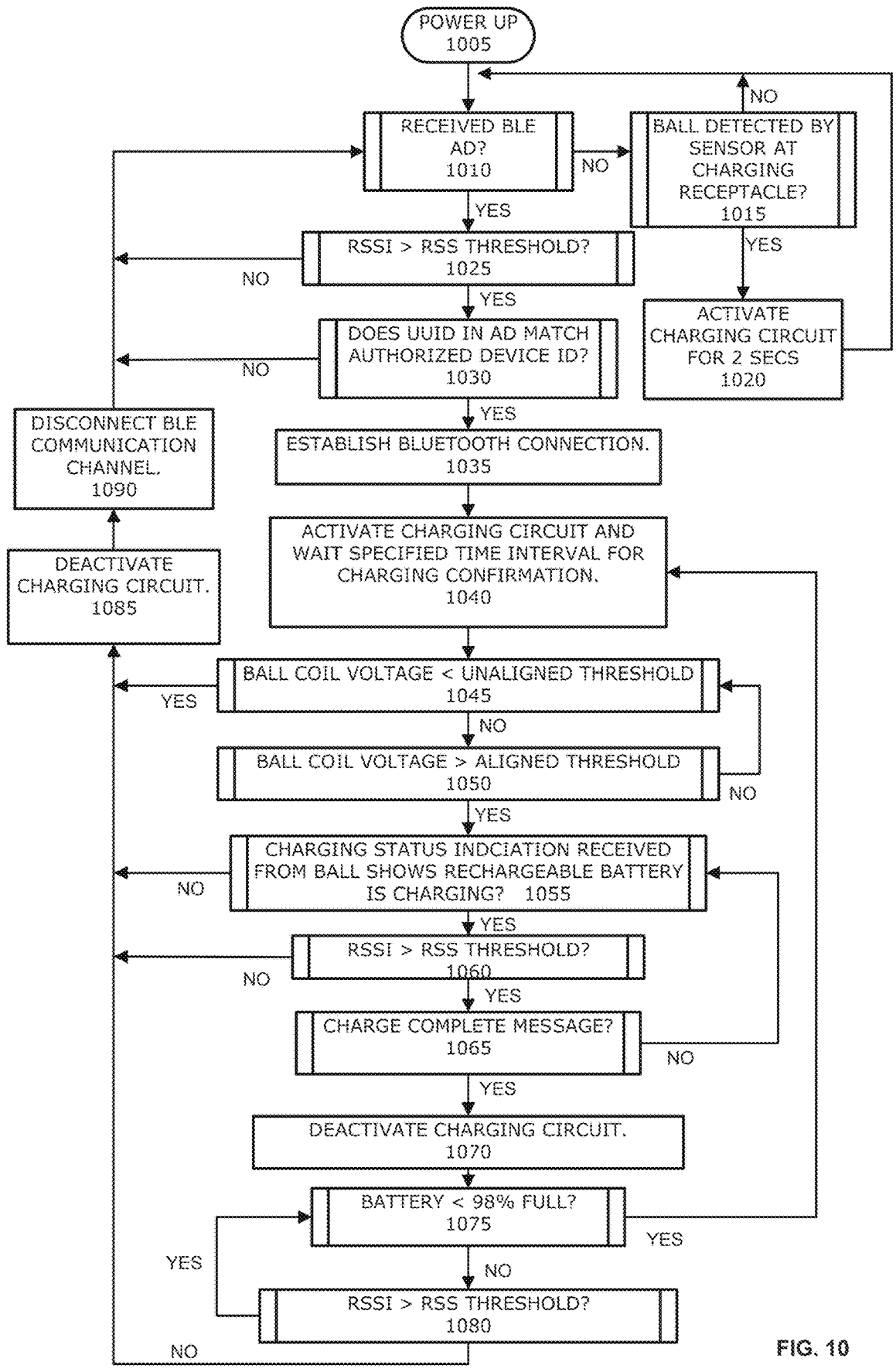
FIG. 10 shows a flow diagram for an algorithm containing steps that are substantially the same as the steps in the algorithm represented by the flow diagram of FIG. 9, except that the algorithm represented by the flow diagram of FIG. 10 adds two additional steps for determining whether the game device is properly aligned on the receptacle of the wireless charging pod.

Handling Alignments and Misalignments of the Game Device on the Wireless Charging Pod Because the components of the charge receiving circuit in the game device can be oriented at different angles relative to the components of the charge transmitting circuit (depending on how the game device is positioned and rotated on top of the receptacle), and the distances between the components of the charge receiving coil and the components of the charge transmitting coil system can vary considerably, it is important to ensure that the game device is properly aligned on the receptacle prior to initiating a charging operation. FIG. 10 shows a modified version of the algorithm depicted in FIG. 9, wherein the modified version of the algorithm includes steps for ensuring that the game device, and therefore the components of the charge receiving circuit in the game device, are properly aligned on the receptacle of the wireless charging pod.

In some embodiments of the present invention, the MCU in the game device is configured to measure and monitor the magnitude of the voltage generated on its charging coil and transmit that voltage magnitude over the data communications link (e.g., the Bluetooth data communications link L1) to the wireless charging pod so that the wireless charging pod can determine how well the game device's receiving coil is aligned with the receiving coil on the charging receptacle. The wireless charging pod may be configured to display an indication of the degree of alignment to the user by changing the color and/or pulse rate of LEDs located on or near the receptacle. In some embodiments, the wireless charging pod may also be configured to transmit a message about the current status of the alignment to another device.

The magnitude of the voltage generated on the charge receiving coil of the game device during a charging operation varies in proportion to how well the charge receiving coil is aligned with the charge transmitting coil on the wireless charging pod. The magnitude of the voltage will be greatest when the charge receiving coil is directly above the charge transmitting coil, and will gradually decrease as the game device is rotated and/or translated to different positions on the receptacle and the charge receiving coil is moved off-center relative the charge transmitting coil. To ensure satisfactory alignment between the transmitting and receiving coils before and during a charging operation (or an attempted charging operation), embodiments of the present invention are configured to activate and/or deactivate the charge transmitting circuit and provide warnings and/or status indications about the quality of the alignment to the user depending on whether the distance and angle between the charge receiving coil and the charge transmitting coil falls inside or outside a predetermined alignment window defined by a specified "unaligned" threshold and a specified "aligned" threshold.

The steps in the algorithm represented by the flow diagram in FIG. 10 are substantially the same as the steps in the algorithm represented by the flow diagram of FIG. 9, except that the algorithm represented by the flow diagram of FIG. 10 adds two additional steps (corresponding to two additional decision boxes 1045 and 1050). The first additional step, represented in FIG. 10 by decision box 1045, determines whether the magnitude of the voltage generated on the ball's charge receiving coil is less than a specified predetermined "unaligned" threshold. The second additional step, represented in FIG. 10 by decision block 1050, determines whether the magnitude of the voltage generated on the ball's charge receiving coil exceeds a specified predetermined "aligned" threshold. The reason for adding two additional steps, instead of adding only a single additional step, is because the game device charge rate varies with how well the charge receiving coil is aligned with the charge transmitting coil. For example, if the charge receiving coil in the game device is barely aligned with the charge transmitting coil in the wireless charging pod, then the rechargeable battery in the game device may charge, but it will charge at a reduced rate, and may take many hours or days to charge to its full capacity. If the charge receiving coil in the game device is well-aligned with the charge transmitting coil in the wireless charging pod, then the rechargeable battery in the game device will charge at a much faster rate. The separate aligned and unaligned thresholds (and the separate steps in the algorithm accounting for the two thresholds) represent the two different scenarios. Exemplary (typical) values for the two alignment threshold voltages are 8-10 V for the aligned threshold and 5 V for the unaligned threshold.

In some embodiments of the present invention, alignment (or misalignment) of the game device may be determined and/or reported to the user by measuring and monitoring the magnitude of the current flowing through the charge receiving coil instead of measuring and monitoring the voltage generated on the charge receiving coil, and then activating and deactivating the charge transmitting circuit and/or providing alignment/misalignment notifications and warnings if and when the magnitude of the measured and monitored current rises above a specified minimum amperage threshold for good alignment or falls below a predetermined maximum amperage threshold for bad alignment.

Algorithm for the Charge Control Program Running on the Game Device

Figure 11:
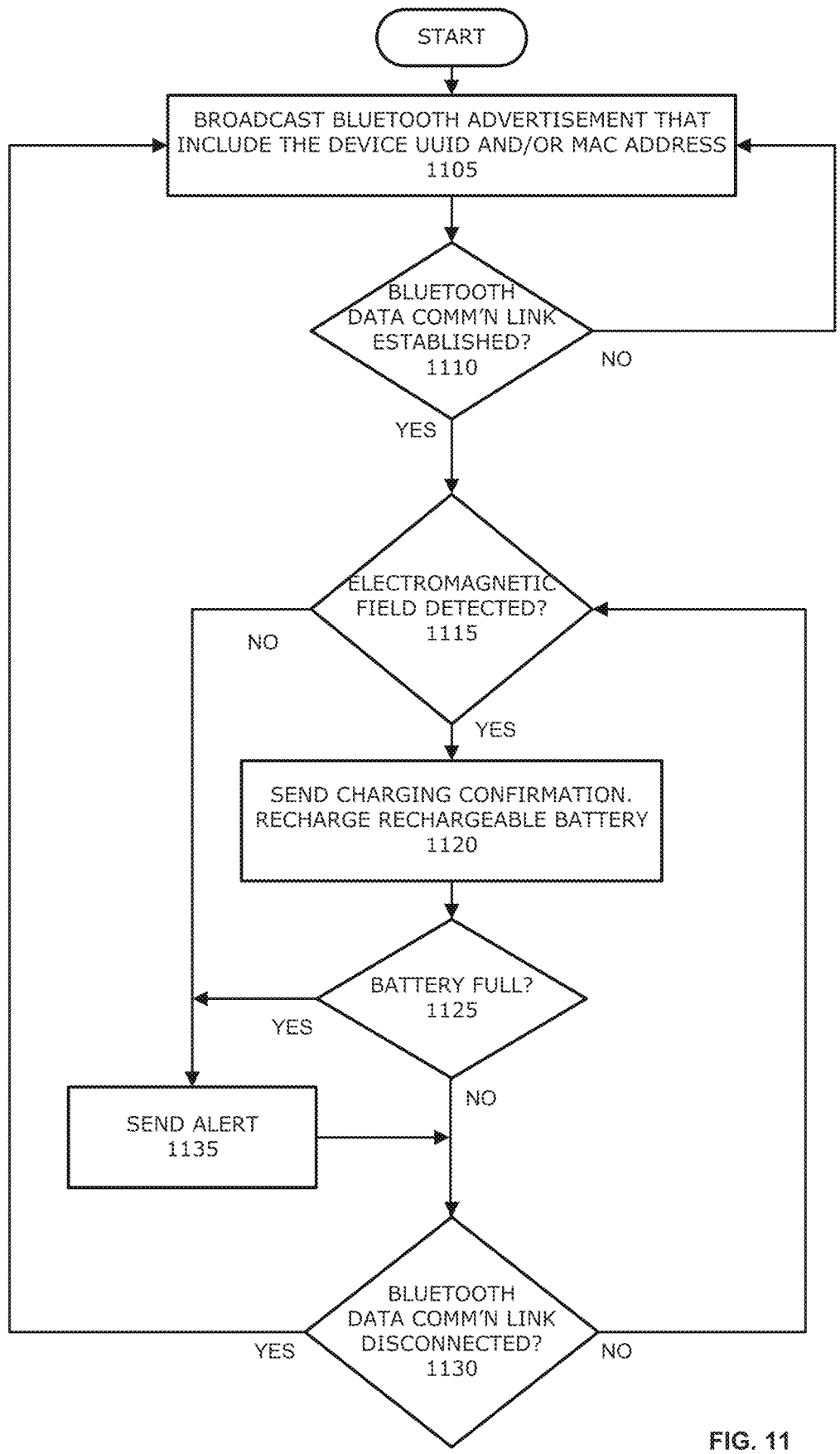
FIG. 11 shows a flow diagram illustrating by way of example, the steps carried out by a charge control program running on the game device to control the communication and status reporting by the game device during charging operations in accordance with some embodiments of the present invention.

FIG. 11 shows a flow diagram illustrating by way of example, some of the steps carried out by a charge control program running on the game device to control the communication and status reporting by the game device during charging operations in accordance with some embodiments of the present invention. As shown in FIG. 11, the charge control program on the game device (such as a basketball with a rechargeable battery) includes program instructions that periodically broadcasts a Bluetooth advertisement until the advertisement is recognized by a wireless charging pod and a Bluetooth data communications link is established between the game device and the wireless charging pod (see steps 1105 and 1110 in FIG. 11). The Bluetooth advertisements typically include a universally unique identifier (UUID) for the game device, which uniquely identifies the individual device manufactured or sold by a certain company, and/or a MAC address, which uniquely identifies all Bluetooth devices, regardless of manufacturer. The wireless charging pod uses the UUID and/or MAC address to determine whether the game device is authorized for charging by that wireless charging pod. Although not shown in FIG. 11, the charge control program running on the game device will cause the game device to stop broadcasting Bluetooth advertisements whenever a Bluetooth communications link has been established between the game device and a wireless charging pod.

Then, in step 1115, the charge control program of the gaming device determines whether it is detecting an electromagnetic field (EF) generated by the wireless charging pod by measuring whether there is any voltage or current being generated on the charge receiving coil. If the answer is no, then the charge control program sends an alert to the wireless charging pod (in step 1135) that the EF being generated by the wireless charging pod is not being detected by the game device. If the EF is not detected by the game device within a specified time limit, the attempts to provide the electromagnetic field to energize the charge receiving coil on the game device will time out and the wireless charging pod will deactivate the charge transmitting circuit (to keep from wasting energy) and disconnect the Bluetooth communications link. Accordingly, in step 1130, the charge control program running on the game device will check to see whether the Bluetooth communications link has been disconnected. If so, then the charge control program in the game device will return to step 1105 and resume broadcasting Bluetooth advertisements.

If the electromagnetic field is detected in step 1115, then the charge control program running on the game device periodically sends a "charging" confirmation to the wireless charging pod and begins recharging the rechargeable battery (see step 1120). While the battery is recharging, the charge control program periodically determines, at step 1125, whether the battery is fully charged. If so, then the charge control program uses the Bluetooth communications link to send a "battery full" alert to the wireless charging pod before proceeding to step 1130, where it again checks the status of the Bluetooth communications link. If, on the other hand, the battery is not full, then the charge control program proceeds directly to step 1130, without sending the "battery full" alert to the wireless charging pod. If the charge control program determines in step 1130 determines that Bluetooth data communications link is not disconnected by the wireless charging pod, then the charge control program returns to steps 1115 and 1120, where it again checks to confirm that the game device is still detecting the electromagnetic field produced by the wireless charging pod and recharging the rechargeable battery.

Figure 12:
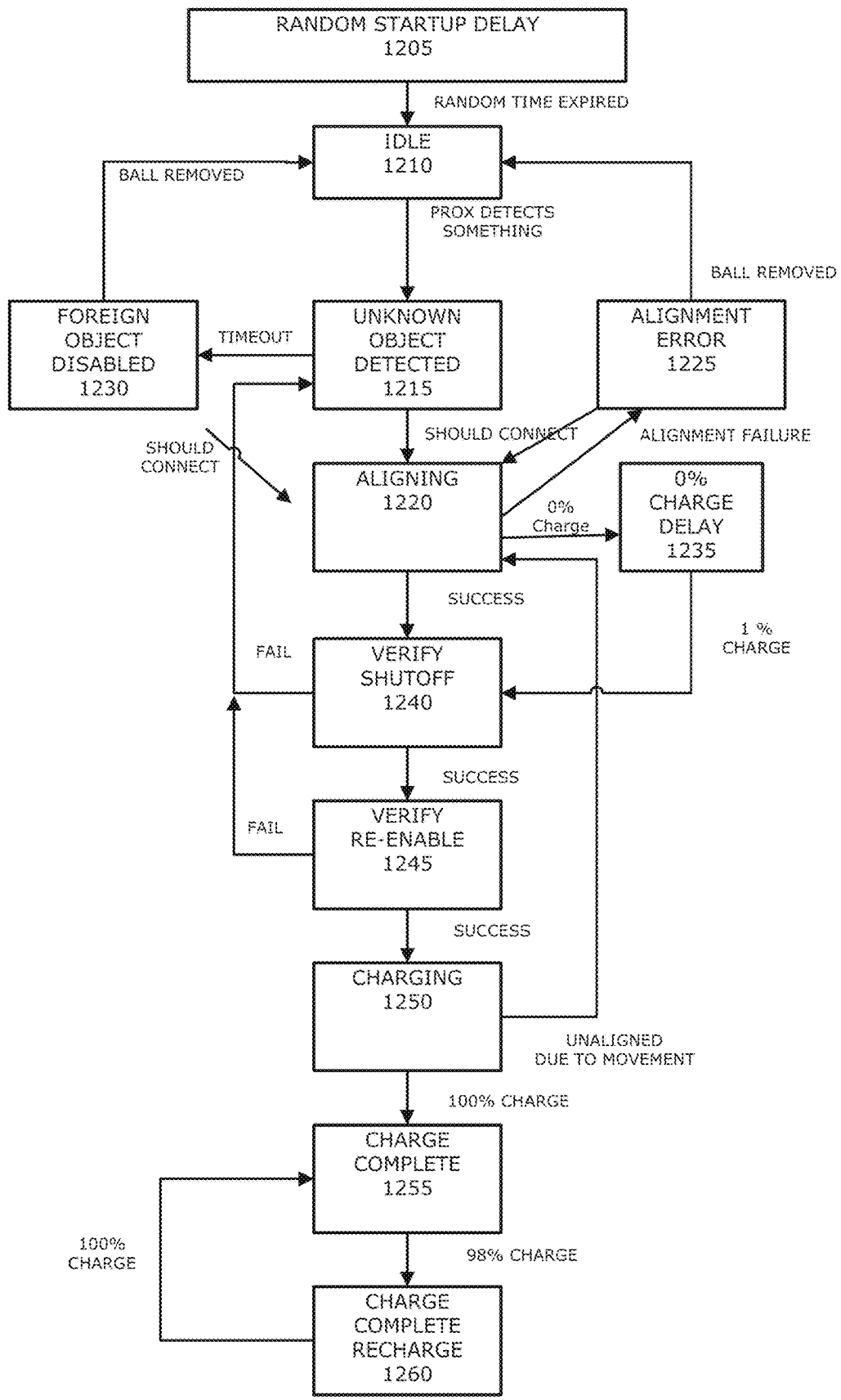
FIG. 12 shows a flow diagram illustrating by way of example, the steps of an alternative algorithm that could be carried out by a charge control program, such as the charge control program 838 in FIG. 8, running on the wireless charging pod, to handle the charging operations and communications of the wireless charging pod.

Alternative Algorithm for Controlling Charge Operations and Detecting Misalignments on the Wireless Charging Pod Using State Machine Logic FIG. 12 shows a flow diagram illustrating by way of example, the steps of an alternative algorithm that could be carried out by a charge control program, such as the charge control program 838 in FIG. 8, running on the wireless charging pod, to handle the charging operations and communications of the wireless charging pod. In this embodiment, the charge control program transitions through twelve different operating states, depending on the occurrence (or non-occurrence) of certain events. The twelve states are as follows (reference numerals for FIG. 12 are listed in parenthesis after the name of each state):

1. RANDOM STARTUP DELAY (1205)
2. IDLE (1210)
3. UNKNOWN OBJECT DETECTED (1215)
4. ALIGNING (1220)
5. ALIGNMENT ERROR (1225)
6. FOREIGN OBJECT DISABLED (1230)
7. ZERO PERCENT CHARGE DELAY (1235)
8. VERIFYING SHUTOFF (1240)
9. VERIFYING RE-ENABLE (1245)
10. CHARGING (1250)
11. CHARGE COMPLETE (1255)
12. CHARGE COMPLETE RECHARGE (1260)

In preferred embodiments, multiple wireless charging pods are daisy chained together and attached to mounting shelves, which are in turn attached to a suitably stable collection of vertical and horizontal frames and supports to provide a portable wireless charging pod rack that can charge a large number (e.g., 20 or 25) game devices with rechargeable batteries, such as basketballs, simultaneously. Because a multiplicity of basketballs are potentially within range of Bluetooth communications of each one of the wireless charging pods on the wireless charging pod rack at any given time, care must be taken to ensure that each wireless charging pod only connects with, communicates with and charges the basketball that is currently located on that particular wireless charging pod, as opposed to erroneously connecting, communicating with and attempting to charge a basketball that is located on a nearby wireless charging pod.

When power is provided to the wireless charging pod, it first enters a Random Startup Delay state, during which the charge control program on the wireless charging pod causes the wireless charging pod to wait a random number of seconds, such as anytime between 0 and 7 seconds, for example, to draw all the operating power it requires from the power source to enable full functionality and/or start initializing memory registers and variables in preparation for generating and receiving messages, processing events and activating and deactivating its charge transmission circuit to recharge a rechargeable battery in a nearby device, such as a basketball. This random startup delay, which would be executed by every charging pod on a rack of twenty or twenty-five charging pods, practically eliminates the possibility of causing electrical damage to the power source or one or more of the wireless charging pods if all twenty or twenty-five of the wireless charging pods on a wireless charging pod rack holding twenty or twenty-five basketballs suddenly attempt to draw all the power they require from a single power source at precisely the same moment, such as when the wireless charging pod rack is plugged into a 120V power outlet. When the random startup time delay expires, the charge control program then transitions from the Random Startup Delay state to the Idle state.

Upon entering the Idle state, embodiments of the present invention may be configured to draw all the power it needs for normal operation from the power source, reset and/or initialize any registers, variables or routines required for normal operation, and/or recalibrate its sensors, such as the proximity sensor (an algorithm for automatically recalibrating the proximity sensor is described in more detail below). The charge control program may also be configured to activate the LED controller to turn the LEDs located on the receptacle of the wireless charging pod to blue, which provides an indication to the user that the wireless charging pod is initialized, recalibrated and ready to detect and start recharging the rechargeable batteries in a basketball placed on top of the receptacle of the wireless charging pod.

Importantly, while the charge control program is the Idle state, the program activates a proximity sensor that uses a reflected beam of infrared light to periodically determine whether the proximity sensor detects an object resting on the receptacle of the wireless charging pod. For example, in some embodiments, the control program and proximity sensor cooperate to check the field of view of the proximity sensor approximately 100 times per second to determine if the readings collected by the proximity sensor meets or exceeds a specified "object detected" threshold, such as 3.75 lux, for a specified time period or number of readings. For instance, if the proximity sensor receives 100 or more readings in a row (over a period of 1 second) that all meet or exceed the specified object detected threshold of 3.75 lux, the control program will interpret this situation as a very strong indication that the reflected infrared beam of light is bouncing off an object that is resting on or extremely close to the receptacle. On the other hand, if the proximity sensor takes 100 or more readings in a row that all fail to meet or exceed a specified "no object detected" threshold, such as 3.0 lux, the control program will interpret this situation as a very strong indicator that there is no object resting on the receptacle.

The system will stay in the Idle state so long as the proximity detector does not detect an object on the receptacle. Suitably, the system will also return to the Idle state from any other state if a previously detected object is removed from the receptacle (so that the proximity sensor does not "see it" anymore) or the current RSSI for a communicating and/or charging object falls below a specified RSSI threshold stored in the memory of the wireless charging pod. To preserve power consumption and bandwidth, embodiments of the present invention may also be configured to switch off Bluetooth advertisement monitoring whenever the system enters the Idle state, and thereby only using the Bluetooth radio frequency transceiver when the proximity sensor has detected an object on the receptacle. In other embodiments, continuing to monitor the network for BLE advertisements while the control program is in the Idle state may not pose a serious processing or bandwidth problem, depending on the environment, the processing power of the microprocessors utilized, and/or the number of Bluetooth devices expected to come into the vicinity of the charging pod.

If an object is detected by the proximity sensor, the control program on the wireless charging pod will transition to the Unknown Object Detected state 1215, switch on its Bluetooth radio frequency transceiver (if it is not already switched on) and start monitoring the wireless network for any BLE advertisements broadcasted by any game devices (basketballs) within BLE broadcasting range of the wireless charging pod. The charge control program will also begin to periodically switch on the charge transmission circuit in the wireless charging device for very short periods of time (e.g., for 1 second out of every 10 seconds) to generate electromagnetic field pulses every 10 seconds or so just in case the closest basketball does not currently have sufficient charge to broadcast BLE advertisements. This helps dead battery balls collect just enough charge to resume broadcasting BLE advertisements.

While in the Unknown Object Detected state, if the control program receives any BLE advertisements, it will first check the Nearby Device Status Table in memory to see if the UUID and/or MAC address contained in the BLE advertisement of the unknown object matches a UUID or MAC address of an authorized device listed in the Nearby Device Status Table. If there is no match in the Nearby Device Status Table, or if the table indicates that the game device is no longer authorized for charging because a specified time period has passed, a timeout event occurs, which causes the wireless charging pod to transition from the Unknown Object Detected state 1215 to the Foreign Object Disabled state 1230 in FIG. 12, which further causes the wireless charging pod to switch off the electromagnetic charging field, and thereby avoid continuing to charge a foreign object and possibly creating a safety hazard.

If a matching UUID or MAC address is found in the Nearby Device Status Table, it means the detected object is a "known device" that is authorized for recharging by this wireless charging pod. If the object is determined to be a known and authorized device, the control program will next calculate the RSSI for the BLE advertisement and will only try to establish communications with the known device if it has an RSSI that meets or exceeds a specified RSSI threshold, such as −52 dB. Any authorized device that is broadcasting with a signal that has an RSSI value of less than the RSSI threshold, such as less than −65 dB, will be ignored until it moves closer to the wireless charging pod, thereby raising its RSSI value to greater than −52 dB.

If the wireless charging pod determines that there is more than one authorized device nearby that is broadcasting with an RSSI that meets or exceeds the RSSI threshold, then the control program is configured to try to connect to the known device that has the strongest RSSI value. This is because, as between two or more detected authorized devices, the goal is to establish a Bluetooth radio frequency communications link with and recharge the detected authorized device that is more likely to be sitting on top of the wireless charging pod's receptacle. Since the authorized device sitting on top of the receptacle probably has the strongest RSSI, the charge control program is configured to establish a Bluetooth communication link (i.e., "connect") with the detected authorized device with the strongest RSSI. Accordingly, when the wireless charging pod has identified the authorized device with the strongest RSSI, it is considered a "should connect" event, which causes the system to transition out of the Unknown Object Detected state and into the Aligning state 1220 of FIG. 12.

In general, the Aligning state works as follows. The charger enters the alignment state when a ball is placed on the wireless charging pod and the charger successfully connects to it over Bluetooth. The ball can tell whether or not it is in a charge field and it is able to tell how well aligned it is within the field. The length of time it takes to charge the ball is dependent on how well-aligned the ball is. The charger can receive the alignment information over the Bluetooth connection. The charger allows the user 15 seconds to properly align the ball and reports on the degree of alignment by pulsing LEDs. The faster the pulse, the better the alignment. Solid LEDs indicate that the ball is successfully aligned.

FIG. 13 shows a diagram illustrating by way of example the contents of a Nearby Device Status Table 1300, stored in the memory of the wireless charging pod, that could be used to monitor and track unique identification numbers (UUIDs) 1305, MAC addresses 1310, RSSI values 1312, timeouts 1315, ages 1320 and validity flags 1325 associated with game devices, such as basketballs, according to certain embodiments of the present invention. The Nearby Device Status Table is initially empty. Whenever the wireless charging pod is powered on, it constantly monitors the Bluetooth BLE network looking for BLE advertisements. Every time the wireless charging pod receives a BLE advertisement containing a new authorized UUID, it writes a new record into the Nearby Device Status Table 1300, the new record containing the UUID 1305 and the MAC address 1310 of the ball broadcasting the BLE advertisement. The program also constantly calculates and/or updates the RSSI value 1312, the age 1320 and the validity 1325 fields for each record. Depending on the number of game devices (e.g., basketballs) that come within Bluetooth advertising range of the wireless charging pod, the Nearby Device Status Table 1300 may contain anywhere from zero to hundreds, or even thousands of records.

In preferred networks, game devices, such as basketballs, are configured to sleep until bounced. A bounce of the ball causes the ball to broadcast BLE advertisements for up to 30 seconds before going back to sleep (stop advertising). Balls will also stop advertising whenever they are connected to a wireless charging pod over the Bluetooth communication channel and recharging. Therefore, whenever a ball is connected and charging, such as when the pod is in the Aligning state, the entry for that ball is removed from the Nearby Device Status Table, which means that ball effectively "disappears" from the view of all other wireless charging pods in the network.

When the proximity sensor detects an object, it sends an alert to the charge control program on the wireless charging pod. The charge control program responds to the proximity sensor alert by checking the records in the Nearby Device Status Table 1300 to determine which nearby ball has the strongest (i.e., most positive) RSSI value, because the ball with the strongest RSSI value is the closest ball, and the closest ball is probably the ball that is now sitting on the receptacle of the wireless charging pod, which is what caused the proximity alert. When the closest ball is identified based on its current RSSI value, the charge control program uses the MAC address of the closest ball to initiate and complete the Bluetooth connection process.

Returning now to FIG. 12, upon entering the Aligning state 1220 of FIG. 12, the charge control program first establishes a data communication link over Bluetooth with the authorized device having the strongest RSSI, and then attempts to determine the alignment status of the connected known device. As previously stated, game devices, such as basketballs, are configured to monitor the voltage and or current in their charge receiving coils. Thus, the game device is capable of reporting over the Bluetooth connection whether the game device is currently detecting the electromagnetic field produced by the activation of the charge transmitting coil in the wireless charging coil. In the Aligning state, the wireless charging pod sends a message to the game device (basketball) over the Bluetooth link requesting that the game device confirm that it currently detects the electromagnetic field that the wireless charging pod turned on when the proximity sensor detected the game device.

The pod can also query the game device on the existing level of the voltage (or current) on the charge receiving circuit. The better aligned the sensor is, the higher the voltage will be on that line. For example, a measurement of 15V means the game device is perfectly aligned. At around 8V, the basketball is misaligned to the point where it will not be able to charge efficiently and will therefore take much longer to charge. Below 4V means the alignment is so poor that there will be no net increase in battery charge level because the ball will be using up all the additional charge provided by the wireless charging pod just to be able to maintain its connection with the wireless charging pod. Therefore, the "sweet spot" for alignment and more efficient charging of the game device may be anywhere from 8V to 15V. If, in response to a query, the game device tells the wireless charging pod that the alignment is below a specified threshold, the charge control program may be configured to activate the LEDs to illuminate, change color or flash at a certain rate or in a certain pattern to indicate to the user that the ball needs to be realigned by slightly rotating or reorienting the ball on the receptacle. Preferably, the LED controller is configured to cause the LEDs to increase the flash rate as the quality of the alignment increases, and to go to a solid (non-flashing) illumination when an acceptable alignment position is achieved. If the alignment problem cannot be remedied by the user in a specified number of seconds (e.g., about 15 seconds, for instance), it is considered an "alignment failure" event, which causes the wireless charging pod to transition from the Aligning state 1220 to the Alignment Error state 1225 in FIG. 12.

In the Alignment Error state 1225, the wireless charging pod "blacklists" the ball in the Nearby Device Status Table by changing a field in the table to indicate that the ball with the alignment problems is now considered "invalid." This will prevent the previously-connected ball from being reconnected for at least 30 seconds upon entry into the Alignment Error and Foreign Object Disabled states. Then the pod attempts to connect to the game device with the second strongest RSSI. If this is successful, a "should connect" event occurs, and the system transitions back into the Aligning state 1220 of FIG. 12. If the misaligned ball is removed from the receptacle while the wireless charging pod is in the Aligned Error state 1225 or the Foreign Object Disabled state 1230, a "ball removed" event occurs, which causes wireless charging pod to disconnect the Bluetooth connection, deactivate the electromagnetic charging field, and transition back to the Idle state 1210 in FIG. 12 to wait for another proximity alert.

If the wireless charging pod of the present invention is in the Aligning state, and in response to a query, the game device tells the wireless charging pod over the Bluetooth connection that the battery on the game device has 0% charge, a 0% charge event occurs, which causes the wireless charging pod to transition from the Aligning state to the 0% Charge Delay state 1235 in FIG. 12, where it will stay until the battery on the game device contains at least a 1% charge, which will cause the wireless charging pod to transition to the Verify Shutoff state 1240 and the Verify Enable state depicted in FIG. 12. In these two states, the wireless charging pod runs two quick tests to confirm that the Bluetooth connection established by the wireless charging pod and the electromagnetic field produced by activating the charging transmission coil on the wireless charging pod are in fact being received and detected by the same game device. In other embodiments, it is also possible for the charging coil to switch off and on in a pre-specified or random pattern, and then make sure that the identical pattern is received and reported by the receiving coil. This further increases the charging pod's confidence level that it has connected to the ball that was placed on its charging coil.

This is accomplished by first switching off the charging transmission coil on the wireless charging pod and asking the Bluetooth connected game device over the Bluetooth link if it has noticed that the electromagnetic field was just switched off. If the game device confirms that it is no longer detecting the electromagnetic field, the wireless charging pod then enters the Verify Re-Enable state 1245, in which it switches the electromagnetic field back on and asks the game device over the Bluetooth link whether it has detected the fact that the electromagnetic field has been restored. If both tests succeed, then the system "knows" that the wireless charging pod is communicating over the Bluetooth link with the very same game device that is being recharged by that wireless charging pod. In other words, if both of these tests succeed, then there is no possibility that the wireless charging pod is communicating over the Bluetooth link with one game device while charging a different game device with the electromagnetic field. This also helps to reduce the possibility of overcharging a game device and thereby creating a fire or other safety hazard. If either one of the tests fails, a failure event occurs, which again sends the wireless charging pod back into the Unknown Object Detected state 1215 of FIG. 12. But if both tests succeed, then the charging pod transitions to the Charging state 1250 in FIG. 12.

The charge control program of the wireless charging pod will remain in the Charging state until the battery in the game device is 100 percent charged (which is a 100% charged event that transitions the system to the Charge Complete state 1225 in FIG. 12) or until the basketball becomes misaligned due to movement of the ball on the receptacle (which constitutes a "unaligned due to movement" event, and which causes the charge control program to transition back to the Aligning state 1220 of FIG. 12).

When it enters the Charge Complete state 1255, the charge control program will turn off the charge transmission coil, thereby removing the electromagnetic field and terminating the charging operation on the basketball's rechargeable battery. The wireless charging pod will stay in the Charge Complete state until the charge on the battery drops to 98%, which causes the charge control program to enter the Charge Complete Recharge state 1260, or until the basketball is removed from the receptacle or the RSSI for the ball drops below the specified RSSI threshold. If the 98% charge event occurs and the system enters the Charge Complete Recharge state 1260 before the ball is removed from the receptacle or the RSSI drops below the RSSI threshold, then the charge control program in the wireless charging pod will reactivate the charge transmission circuit in the wireless charging pod to re-establish the electromagnetic field, and thereby top off the battery until it is 100% charged again. In other embodiments, the charging coil may be left on constantly to ensure the ball is always at 100% charge capacity.

Algorithms for Automatically Detecting Objects on the Receptacle Using a Proximity Sensor Typically, a proximity sensor will require an using an offset that takes into account imperfect or inaccurate proximity readings caused by limitations and slight defects in the manufacturing process, as well as imperfect proximity readings resulting from drift over time from normal use, such as imperfections caused by protective lens covers over infrared sensors that collect dust and other particles over time and therefore are not perfectly transparent. By periodically recalibrating the offset for a proximity sensor, slight discrepancies and inaccuracies in the proximity sensor readings can be substantially reduced or eliminated to improve the accuracy of the proximity sensor readings and extend the useful life of the proximity sensor. The recalibrated proximity sensor offset is typically stored in flash memory on the printed circuit board of the wireless charging pod and retrieved as necessary and used by the system to determine whether there is an object on the receptacle of the wireless charging pod.

Figure 14:
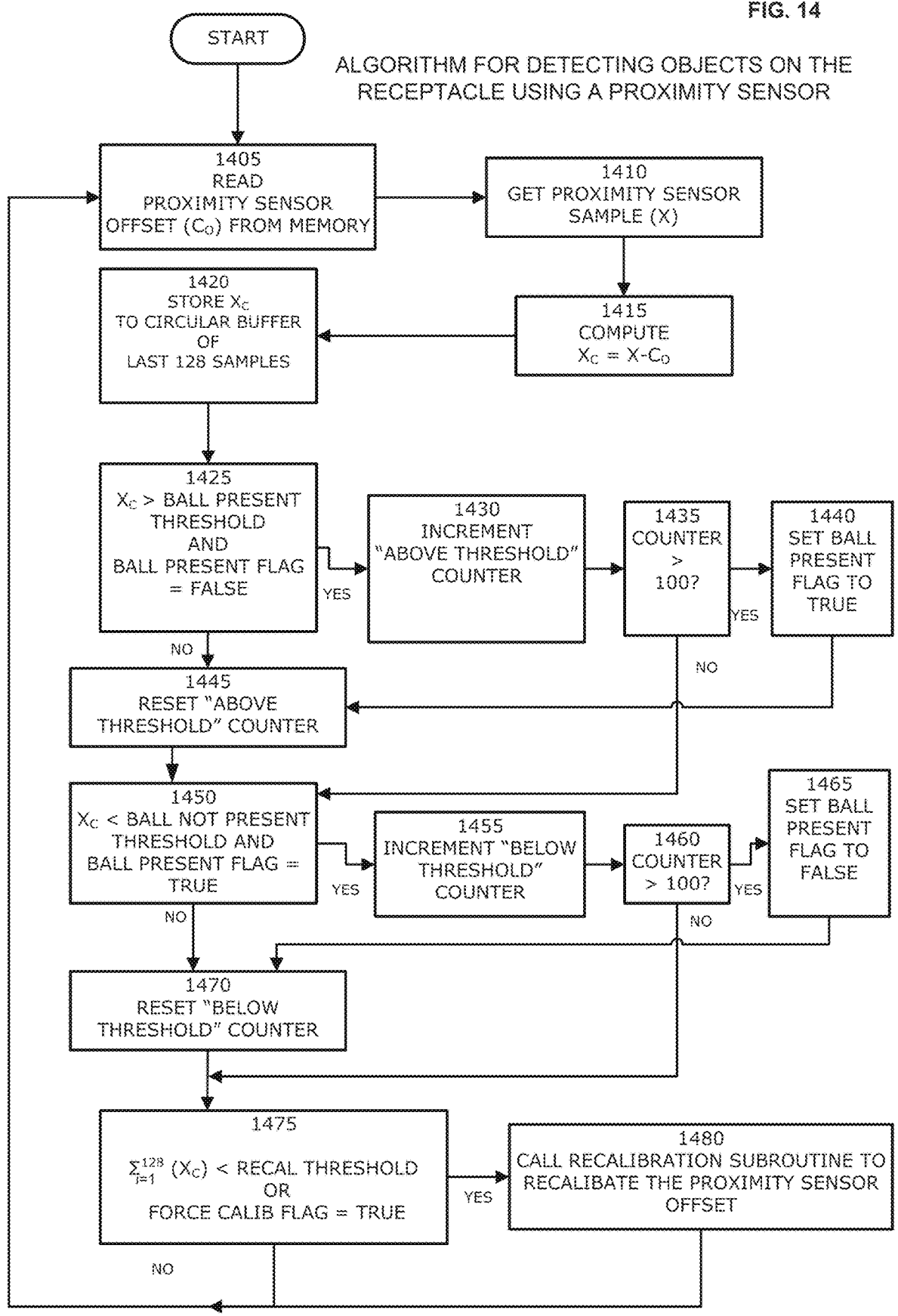
FIG. 14 shows a flow diagram illustrating by way of example, the steps of an algorithm that could be carried out by a charge control program, such as the charge control program in FIG. 8, to automatically determine whether an object, such as a basketball with a rechargeable battery, is on top of the receptacle of the wireless charging pod, and to automatically determine whether the proximity sensor offset needs recalibration.
Figure 15:
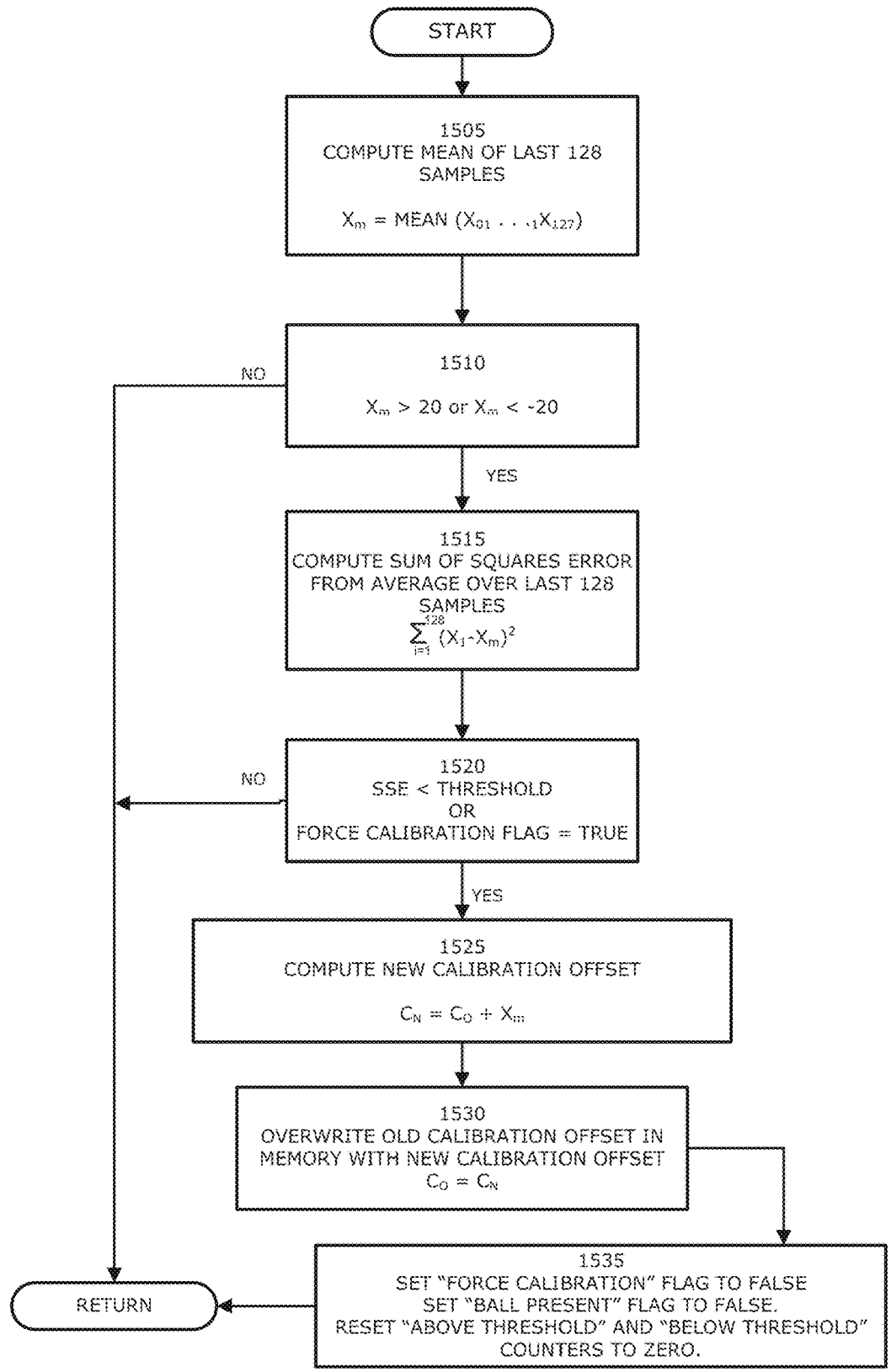
FIG. 15 shows a flow diagram illustrating by way of example, the steps of an algorithm that could be used to automatically recalibrate the proximity sensor offset in some embodiments of the present invention. Typically, all of the steps will be carried out by a microprocessor unit MCU operating under the control of an application program comprising program instructions arranged to cause the MCU to activate the proximity sensor to take samples and process the data associated with those samples.

FIG. 14 shows a flow diagram illustrating by way of example, the steps of an algorithm that could be carried out by a charge control program, such as the charge control program 818 in FIG. 8, to automatically determine whether an object, such as a basketball with a rechargeable battery, is on top of the receptacle of the wireless charging pod, and to automatically determine whether the proximity sensor offset needs recalibration. FIG. 15 shows a flow diagram illustrating by way of example, the steps of an algorithm that could be used to automatically recalibrate the proximity sensor offset in some embodiments of the present invention. Typically, all of the steps will be carried out by a microprocessor unit MCU operating under the control of an application program comprising program instructions arranged to cause the MCU to activate the proximity sensor to take samples and process the data associated with those samples.

In general, the two algorithms illustrated by FIGS. 14 and 15 operate as follows. The algorithm illustrated by the flow diagram shown in FIG. 14, shows how the wireless charging pod of the present invention uses a proximity sensor to determine whether an object (e.g. a basketball) is present on the receptacle within view of the proximity sensor. The algorithm illustrated by the flow diagram shown in FIG. 15 may be called, if necessary, at step 1480 of the flow diagram in FIG. 14 in order to automatically recalibrate the proximity sensor offset. Notably, in preferred embodiments, the "ball present" threshold used for determining whether a ball is present is different from the "ball not present" threshold for detecting if a ball is not present. This is to avoid rapidly switching between the conclusion that the ball is present one second the conclusion that the ball not present in the next second based on small differences in the proximity sensor readings. In one embodiment, for example, the system uses a ball present threshold value of 300 (which is actually 3.75 lux because the sensor takes readings in units of 0.0125 lux) and a ball not present threshold value of 240 (which is actually 240 lux taking into account the 0.0125 unit multiplier). The 60-point spread between the two threshold values avoids a situation wherein the system rapidly switches back and forth between determining that the ball is present and the ball is not present. These threshold values may, of course, vary considerably depending on the proximity sensor being used.

As shown in FIG. 14, the object detection algorithm begins at step 1405 by reading the current proximity sensor calibration offset $C_O$ from the memory of the wireless charging pod. If no calibration offset is stored in the memory, the calibration offset is initially set to zero (not shown in the flow diagram). Next, the MCU in the wireless charging pod, operating under the control of an application program, causes the proximity sensor to take a sample reading X. See step 1410 in FIG. 14. Then, at step 1415, a calibrated sample reading $X_C$ is calculated by subtracting the calibration offset from the sample reading X. In step 1420, the calibrated sample reading $X_C$ is stored in a circular buffer configured to store the last 128 sample readings $X_1$ through $X_{128}$.

In step 1425, the system determines whether the calibrated sample $X_C$ is greater than a specified predetermined ball present threshold and the ball not present flag has been set to "true." If both statements are true, an "ABOVE THRESHOLD" counter, which is used to count the number of times the sample reading is above the threshold, is incremented by 1 in step 1430. Next, in step 1435, the program compares the value of the "ABOVE THRESHOLD" counter to 100 (or some other chosen number, depending on the programmer choice) to determine whether the sampled values from the proximity sensor exceeded the value of the ball present threshold for the last 100 times in a row. If the answer is "YES," then this is considered to be a confirmation that a "BALL PRESENT" event has occurred (i.e., a confirmation that a ball is present on the receptacle). Accordingly, a ball present flag is set to "TRUE" (step 1440) and the "ABOVE THRESHOLD" counter is reset to zero (step 1445). The ball present flag may then be used by other routines in the system, such as the routine represented by the flow diagram of FIG. 12, to determine how the wireless charging pod will respond to the fact that a ball has been detected on the receptacle. On the other hand, if it is determined in step 1435 that the sampled values from the proximity sensor have not exceeded the value of the ball present threshold for the last 100 times in a row, processing continues at steps 1450, where the program checks to see if the calibrated sample $X_C$ is less than a "BALL NOT PRESENT" threshold.

Notably, the "BALL PRESENT" threshold and the "BALL NOT PRESENT" threshold are not necessarily the same. In preferred embodiments there is a spread between these two thresholds to avoid a situation where the system rapidly switches back and forth between determining that a ball is present and that a ball is not present because of small fluctuations in the proximity sensor readings. If the calibrated sample is less than the "BALL NOT PRESENT" threshold, then processing continues at steps 1455 and 1460, where the program determines whether the calibrated sample $X_C$ has been below the "BALL NOT PRESENT" threshold for the last 100 times in a row, and if so, sets the "BALL PRESENT FLAG" to "FALSE" in step 1465. The program than resets the "BELOW THRESHOLD" counter (at step 1470) before proceeding to step 1475.

At step 1475, regardless of the number of times the calibrated sample $X_C$ has been above or below one of the two thresholds, the system determines whether it is advisable to recalibrate the proximity sensor offset. In preferred embodiments of the present invention, there are a number of conditions that could lead to a recalibration of the proximity sensor offset. These conditions may be classified as unforced recalibration triggers and forced recalibration triggers.

Unforced Recalibration Triggers

An unforced recalibration of the proximity sensor offset may be triggered, for example, if the sum of the most recent samples in the recent sample circular buffer is less than a specified negative recalibration threshold (say, for example, −6400). This is an indication that the wireless charging pod has previously recalibrated the sensor while a ball was present, and now the ball has been removed, resulting in a large negative sum.

An unforced recalibration of the proximity sensor offset may also be triggered when the proximity sensor no longer detects the presence of a ball, and the wireless charging pod is also not in the alignment state (during alignment the ball can be picked up and moved/rotated, so it is best not to try to recalibrate the proximity sensor offset during that time.

Forced Calibration Triggers

Figure 16A:
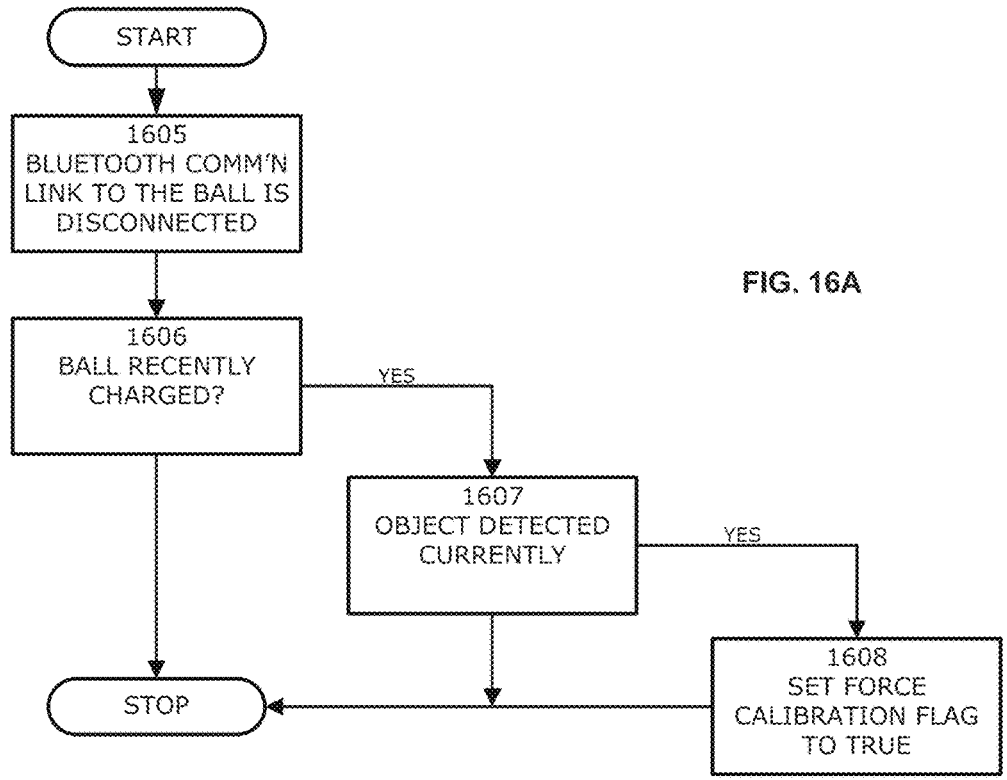
FIG. 16A shows an exemplary flow diagram illustrating by way of example the steps of an algorithm that could be used to set the force calibration flag in some embodiments of the present invention when the data communications channel between the wireless charging pod and the game device has been lost.

A forced recalibration of the proximity sensor offset may be triggered, for example, if the wireless charging pod disconnects the Bluetooth communication channel to a fully charged ball, but the object detection algorithm represented by the flow diagram of FIG. 14 still concludes that the ball is present. This is a strong indication that the proximity sensor offset needs recalibration because the ball has most likely been removed from the charger. FIG. 16A shows an exemplary flow diagram illustrating by way of example the steps of an algorithm that could be used to set the force calibration flag in some embodiments of the present invention when the data communications channel between the wireless charging pod and the game device has been lost.

Figure 16B:
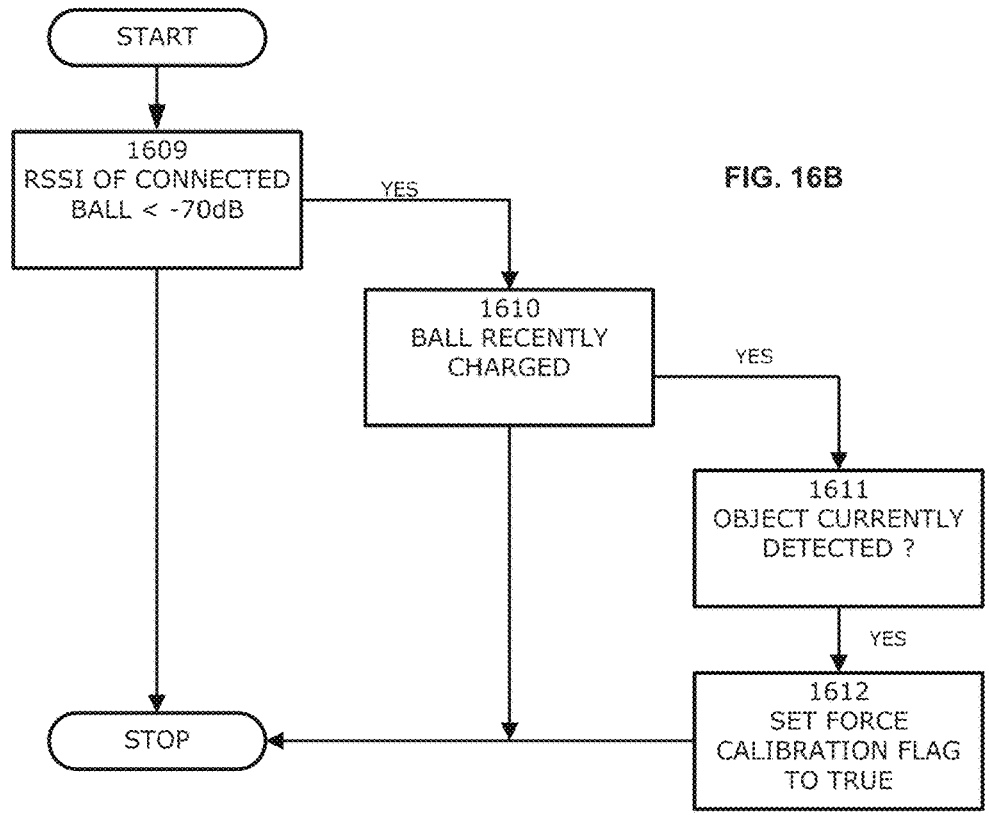
FIG. 16B shows an exemplary flow diagram illustrating by way of example the steps of an algorithm that could be used to set the force calibration flag in some embodiments of the present invention when the data communications link L1 is intact, but the RSSI for the game device falls below the RSSI threshold.

A forced recalibration of the proximity sensor offset may be triggered, for example, if the RSSI of a recently charged ball drops below a removal threshold (e.g., −70 dB), but the object detection algorithm still thinks a ball is present. This is a strong indication that the proximity sensor offset for the wireless charging pod needs recalibration because the very low RSSI value suggests that the ball has most likely been removed and taken far away from the charger, and yet the proximity sensor reading says the ball is still present. FIG. 16B shows an exemplary flow diagram illustrating by way of example the steps of an algorithm that could be used to set the force calibration flag in some embodiments of the present invention when the data communications link L1 is intact, but the RSSI for the game device falls below the RSSI threshold.

Returning again to step 1475 of FIG. 14, the wireless charging pod determines whether to call the recalibration routine and let the recalibration routine determine whether recalibrating the proximity sensor offset is necessary. This is accomplished by first calculating the sum of all of last 128 calibrated samples in the circular buffer populated by step 1420 of the flow diagram of FIG. 14. The result is then compared to a predefined recalibration threshold, such as −6400. If the sum of the finite series of 128 calibrated samples is less than the predefined recalibration threshold (e.g., −6400), or if the force recalibration flag is set to "TRUE," then the wireless charging pod of the present invention will, as shown in step 1480 of FIG. 14, call the recalibration subroutine illustrated by the flow diagram shown in FIG. 15. But if the sum is not less than the predefined recalibration threshold, processing of the algorithm returns to step 1405 without calling the recalibration subroutine represented by the flow diagram shown in FIG. 15.

The recalibration subroutine shown in FIG. 15 has a single input, namely, the force recalibration flag, which determines whether the program executing the algorithm should consider how stable the recent sample data has been. If the recent sample data is not stable, then it is likely that the ball has been moving around in the pod's receptacle and is probably still present. It is often not a good idea to try to recalibrate the proximity sensor offset while there is a ball still on the charger. As shown in FIG. 15, to recalibrate the offset, the program executing the algorithm of FIG. 15 first computes the mean of the last 128 calibrated samples (step 1505). Then, in step 1510, the routine determines whether the mean is greater than 20 lux or less than negative 20 lux. If not greater than 20 or less than negative 20, the routine stops executing and returns to the main program shown in FIG. 14 without calculating a new proximity sensor offset. But if the mean is greater than 20 or less than negative 20, then the routine will compute the sum of squares error from the average of the last 128 calibrated sample values (step 1515). If the sum of squares error is less than the predefined recalibration threshold, or the force recalibration flag is set to "TRUE," then the program executing this routine will calculate a new calibration offset by adding the mean $X_m$ of the last 128 calibrated samples to the old calibration offset $C_O$, overwrite the old calibration offset in memory with new calibration offset, reset the counters and flags, and then return to step 1405 of the algorithm illustrated by FIG. 14. See steps 1525, 1530 and 1535 of FIG. 15.

Although the exemplary embodiments, uses and advantages of the invention have been disclosed above with a certain degree of particularity, it will be apparent to those skilled in the art upon consideration of this specification and practice of the invention as disclosed herein that alterations and modifications can be made without departing from the spirit or the scope of the invention, which are intended to be limited only by the following claims and equivalents thereof.

What is claimed is:

1. A system for automatically detecting that an object with a rechargeable battery is close to or in contact with a wireless charging pod for the object, and initiating a wireless charging operation for said object when said object is detected, the system comprising:
   a) a receptacle configured to hold the object with the rechargeable battery;
   b) an optical sensor configured to detect the presence or absence of a reflected beam of light;
   c) a microcontroller;
   d) a wireless charging transmission circuit configured to recharge the rechargeable battery when activated by the microcontroller;
   e) a memory that stores a current optical sensor calibration offset $C_O$, a predetermined OBJECT IS PRESENT threshold and an OBJECT IS PRESENT flag; and
   f) a charge control program, stored in the memory, the charge control program including programming instructions that, when executed by the microcontroller, will cause the microcontroller to repetitively carry out the following steps (i) through (v) until the OBJECT IS PRESENT flag is set to TRUE
      (i) retrieve the current proximity sensor calibration offset $C_O$ from the memory;
      (ii) activate the optical sensor to take a sample reading X,
      (iii) calculate a calibrated sample reading $X_C$ by subtracting the current optical sensor calibration offset $C_O$ from the sample reading X,
      (iv) compare the calibrated sample reading $X_C$ to the predetermined OBJECT IS PRESENT threshold, and
      (v) set the OBJECT IS PRESENT flag to TRUE if the calibrated sample reading $X_C$ meets or exceeds the predetermined OBJECT IS PRESENT threshold;
   g) wherein the charge control program further includes program instructions that, when executed by the microcontroller, will cause the microcontroller to activate the wireless charging transmission circuit to start recharging the rechargeable battery in the object if the OBJECT IS PRESENT flag is set to TRUE.

2. The system of claim 1, wherein:
   a) the memory further stores an ABOVE THRESHOLD counter and a specified minimum number of times in a row that the calibrated sample reading $X_C$ must have a value that is greater than or equal to the predetermined OBJECT IS PRESENT threshold; and
   b) the charge control program further includes programming instructions that, when executed by the microcontroller, will cause the microcontroller to repetitively carry out the following steps (i) through (iii) until the OBJECT IS PRESENT flag is set to TRUE
      (i) increment the ABOVE THRESHOLD counter every time the calibrated sample reading $X_C$ meets or exceeds the predetermined OBJECT IS PRESENT threshold,
      (ii) compare the ABOVE THRESHOLD counter to the specified minimum number of times in a row that the calibrated sample reading $X_C$ must have a value that is greater than or equal to the predetermined OBJECT IS PRESENT threshold, and
      (iii) set the OBJECT IS PRESENT flag to TRUE only if the ABOVE THRESHOLD counter meets or exceeds the specified minimum number of times in a row.

3. The system of claim 1, wherein:
   a) the memory further stores a predetermined OBJECT IS NOT PRESENT threshold; and
   b) the charge control program further includes programming instructions that, when executed by the microcontroller, will cause the microcontroller to repetitively carry out the following steps (i) and (ii) until the OBJECT IS PRESENT flag is set to FALSE
      (i) compare each calibrated sample reading $X_C$ to the predetermined OBJECT IS NOT PRESENT threshold, and (ii) set the OBJECT IS PRESENT flag to FALSE if the calibrated sample reading $X_C$ is less than the predetermined OBJECT IS NOT PRESENT threshold.

c) wherein the charge control program further includes program instructions that, when executed by the microcontroller, will cause the microcontroller to deactivate the wireless charging transmission circuit if the OBJECT IS PRESENT flag is set to FALSE.

4. The system of claim 1, wherein:

a) the memory further stores a BELOW THRESHOLD counter and a specified minimum number of times in a row that the calibrated sample reading $X_C$ must have a value that is less than the predetermined OBJECT IS NOT PRESENT threshold; and b) the charge control program further includes programming instructions that, when executed by the microcontroller, will cause the microcontroller to (i) increment the BELOW THRESHOLD counter every time the calibrated sample reading $X_C$ is less than the predetermined OBJECT IS NOT PRESENT threshold, (ii) compare the BELOW THRESHOLD counter to the specified minimum number of times in a row that the calibrated sample reading $X_C$ must have a value that is less than to the predetermined OBJECT IS NOT PRESENT threshold, and (iii) set the OBJECT IS PRESENT flag to FALSE only if the BELOW THRESHOLD counter is less than the specified minimum number of times in a row.

5. The system of claim 1, wherein the predetermined OBJECT IS PRESENT threshold is not equal to the predetermined OBJECT IS NOT PRESENT threshold.

6. The system of claim 1, wherein:

a) the memory includes a circular buffer configured to store a predetermined number of calibrated sample readings, and a specified offset recalibration threshold; and b) the charge control program further comprises program instructions that, when executed by the microcontroller, will cause the microcontroller to (i) store each calibrated sample reading $X_C$ in the circular buffer, (ii) periodically calculate a sum of the calibrated sample readings stored in the circular buffer, (iii) compare the sum to the specified offset recalibration threshold, (iv) calculate a new optical sensor calibration offset if the calculated sum is less than the specified offset recalibration threshold, and (v) overwrite the current optical sensor calibration offset in the memory with the new optical sensor calibration offset.

7. The system of claim 6, wherein charge control program causes the microcontroller to calculate the new optical sensor calibration offset by:

a) calculating an average value for the calibrated sample readings stored in the circular buffer;

b) calculating a sum of squares error from the average value;

c) comparing the sum of squares error to the specified offset recalibration threshold; and d) if the sum of squares error is less than the specified offset recalibration threshold, calculating a mean value $X_m$ for a predefined number of recent calibrated sample readings stored in the circular buffer and adding the mean value $X_m$ to the current optical sensor calibration offset $C_O$.

8. A computer-implemented method for automatically detecting that an object with a rechargeable battery is close to or in contact with a wireless charging pod for the object, and automatically initiating a charging operation for said object if said object is detected, using an optical sensor, a microcontroller, a wireless charging transmission circuit and a memory, the method comprising the steps of:

a) storing in the memory a current optical sensor calibration offset $C_O$ for the optical sensor, a predetermined OBJECT IS PRESENT threshold and an OBJECT IS PRESENT flag;

b) repetitively carrying out the following steps (i) through (v) with the microcontroller until the OBJECT IS PRESENT flag is set to TRUE (i) retrieving the current proximity sensor calibration offset $C_O$ from the memory;

(ii) activating the optical sensor to take a sample reading X, (iii) calculating a calibrated sample reading $X_C$ by subtracting the current optical sensor calibration offset $C_O$ from the sample reading X, (iv) comparing the calibrated sample reading $X_C$ to the predetermined OBJECT IS PRESENT threshold, and (v) setting the OBJECT IS PRESENT flag to TRUE if the calibrated sample reading $X_C$ meets or exceeds the predetermined OBJECT IS PRESENT threshold; and c) with the microcontroller, activating the wireless charging transmission circuit to start recharging the rechargeable battery in the object if the OBJECT IS PRESENT flag is set to TRUE.

9. The computer-implemented method of claim 8, further comprising:

a) storing in the memory an ABOVE THRESHOLD counter and a specified minimum number of times in a row that the calibrated sample reading $X_C$ must have a value that is greater than or equal to the predetermined OBJECT IS PRESENT threshold; and b) with the microcontroller, repetitively carrying out the following steps (i) through (iii) until the OBJECT IS PRESENT flag is set to TRUE (i) incrementing the ABOVE THRESHOLD counter every time the calibrated sample reading $X_C$ meets or exceeds the predetermined OBJECT IS PRESENT threshold, (ii) comparing the ABOVE THRESHOLD counter to the specified minimum number of times in a row that the calibrated sample reading $X_C$ must have a value that is greater than or equal to the predetermined OBJECT IS PRESENT threshold, and (iii) setting the OBJECT IS PRESENT flag to TRUE only if the ABOVE THRESHOLD counter meets or exceeds the specified minimum number of times in a row.

10. The computer-implemented method of claim 8, further comprising:

a) storing in the memory a predetermined OBJECT IS NOT PRESENT threshold, and b) with the microcontroller, repetitively carrying out the following steps (i) through (iii) until the OBJECT IS PRESENT flag is set to FALSE (i) comparing each calibrated sample reading $X_C$ to the predetermined OBJECT IS NOT PRESENT threshold, (ii) setting the OBJECT IS PRESENT flag to FALSE if the calibrated sample reading $X_C$ is less than the predetermined OBJECT IS NOT PRESENT threshold, and (iii) deactivating the wireless charging transmission circuit if the OBJECT IS PRESENT flag is set to FALSE.

11. The computer-implemented method of claim 8, further comprising:
   a) storing in the memory a BELOW THRESHOLD counter and a specified minimum number of times in a row that the calibrated sample reading $X_C$ must have a value that is less than the predetermined OBJECT IS NOT PRESENT threshold; and
   b) with the microcontroller
      (i) incrementing the BELOW THRESHOLD counter every time the calibrated sample reading $X_C$ is less than the predetermined OBJECT IS NOT PRESENT threshold,
      (ii) comparing the BELOW THRESHOLD counter to the specified minimum number of times in a row that the calibrated sample reading $X_C$ must have a value that is less than to the predetermined OBJECT IS NOT PRESENT threshold, and
      (iii) setting the OBJECT IS PRESENT flag to FALSE only if the BELOW THRESHOLD counter is less than the specified minimum number of times in a row.

12. The computer-implemented method of claim 8, wherein the predetermined OBJECT IS PRESENT threshold is not equal to the predetermined OBJECT IS NOT PRESENT threshold.

13. The computer-implemented method of claim 8, further comprising:
   a) storing each calibrated sample reading $X_C$ in a circular buffer in the memory, the circular buffer configured to store a predetermined number of calibrated sample readings, and a specified offset recalibration threshold;
   b) periodically calculating a sum of the calibrated sample readings stored in the circular buffer;
   c) comparing the sum to the specified offset recalibration threshold;
   d) calculating a new optical sensor calibration offset if the calculated sum is less than the specified offset recalibration threshold; and
   e) overwriting the current optical sensor calibration offset in the memory with the new optical sensor calibration offset.

14. The computer-implemented method of claim 13, wherein the step of calculating the new optical sensor calibration offset with the microprocessor comprises:
   a) calculating an average value for the calibrated sample readings stored in the circular buffer;
   b) calculating a sum of squares error from the average value;
   c) comparing the sum of squares error to the specified offset recalibration threshold; and
   d) if the sum of squares error is less than the specified offset recalibration threshold, calculating a mean value $X_m$ for a predefined number of recent calibrated sample readings stored in the circular buffer and adding the mean value $X_m$ to the current optical sensor calibration offset $C_O$.

* * * * *